(12) United States Patent
Bryant et al.

(10) Patent No.: US 10,158,630 B2
(45) Date of Patent: Dec. 18, 2018

(54) CONTROLLING DEVICE OPERATION BASED ON INTERACTION WITH ADDITIONAL DEVICE

(71) Applicant: Bank of America Corporation, Charlotte, NC (US)

(72) Inventors: Matthew K. Bryant, Gastonia, NC (US); Nathan Dent, Concord, NC (US)

(73) Assignee: Bank of America Corporation, Charlotte, NC (US)

( * ) Notice: Subject to any disclaimer, the term of this patent is extended or adjusted under 35 U.S.C. 154(b) by 170 days.

(21) Appl. No.: 15/252,830

(22) Filed: Aug. 31, 2016

(65) Prior Publication Data

US 2018/0063125 A1   Mar. 1, 2018

(51) Int. Cl.
| | |
|---|---|
| *G06F 7/04* | (2006.01) |
| *H04L 29/06* | (2006.01) |
| *G06F 3/0482* | (2013.01) |
| *G06Q 20/10* | (2012.01) |
| *G06Q 20/32* | (2012.01) |
| *G06Q 20/40* | (2012.01) |
| *H04W 88/02* | (2009.01) |

(52) U.S. Cl.
CPC ........ *H04L 63/0838* (2013.01); *G06F 3/0482* (2013.01); *G06Q 20/1085* (2013.01); *G06Q 20/32* (2013.01); *G06Q 20/401* (2013.01); *H04W 88/02* (2013.01)

(58) Field of Classification Search
CPC .............. H04L 63/0838; G06F 3/0482; G06Q 20/1085; H04W 88/02
USPC ............................................................ 726/6
See application file for complete search history.

(56) References Cited

U.S. PATENT DOCUMENTS

| | | | |
|---|---|---|---|
| 6,854,645 B1 | 2/2005 | Somers, Jr. et al. | |
| 6,901,382 B1 | 5/2005 | Richards et al. | |
| 6,970,846 B1 | 11/2005 | Drummond et al. | |
| 7,039,600 B1 | 5/2006 | Meek et al. | |
| 7,039,703 B1 | 5/2006 | Clancy et al. | |
| 7,080,036 B1 | 7/2006 | Drummond et al. | |
| 7,419,091 B1 | 9/2008 | Scanlon | |
| 8,496,168 B1 * | 7/2013 | Miller | G06Q 20/3221 235/379 |
| 2003/0066876 A1 | 4/2003 | Goldman et al. | |

(Continued)

*Primary Examiner* — Mohammad W Reza
(74) *Attorney, Agent, or Firm* — Banner & Witcoff, Ltd.; Michael A. Springs

(57) ABSTRACT

Systems and arrangements for modifying the functionality of a computing device are provided. A user may initiate an event at the computing device and may select an option to provide enhanced operations. The system may then modify the functionality of the computing device to enable enhanced operations and may request authentication information from the user. The authentication information may be provided via a mobile computing device of the user and may include, in some arrangements, biometric information of the user. Upon authenticating the user, a user interface may be generated including enhanced operations available for selection. Selection of an operation may be received and the system may determine whether additional information is needed to process the operation. The additional information may be received from the mobile computing device of the user. Upon receiving the additional information, the event/operation may be processed and the enhanced operations may be disabled.

18 Claims, 18 Drawing Sheets

(56) References Cited

U.S. PATENT DOCUMENTS

| | | | |
|---|---|---|---|
| 2003/0120597 A1 | 6/2003 | Drummond et al. | |
| 2006/0038004 A1* | 2/2006 | Rielly | G06Q 20/1085 235/379 |
| 2012/0173311 A1* | 7/2012 | Chang | G06Q 20/1085 705/14.1 |

* cited by examiner

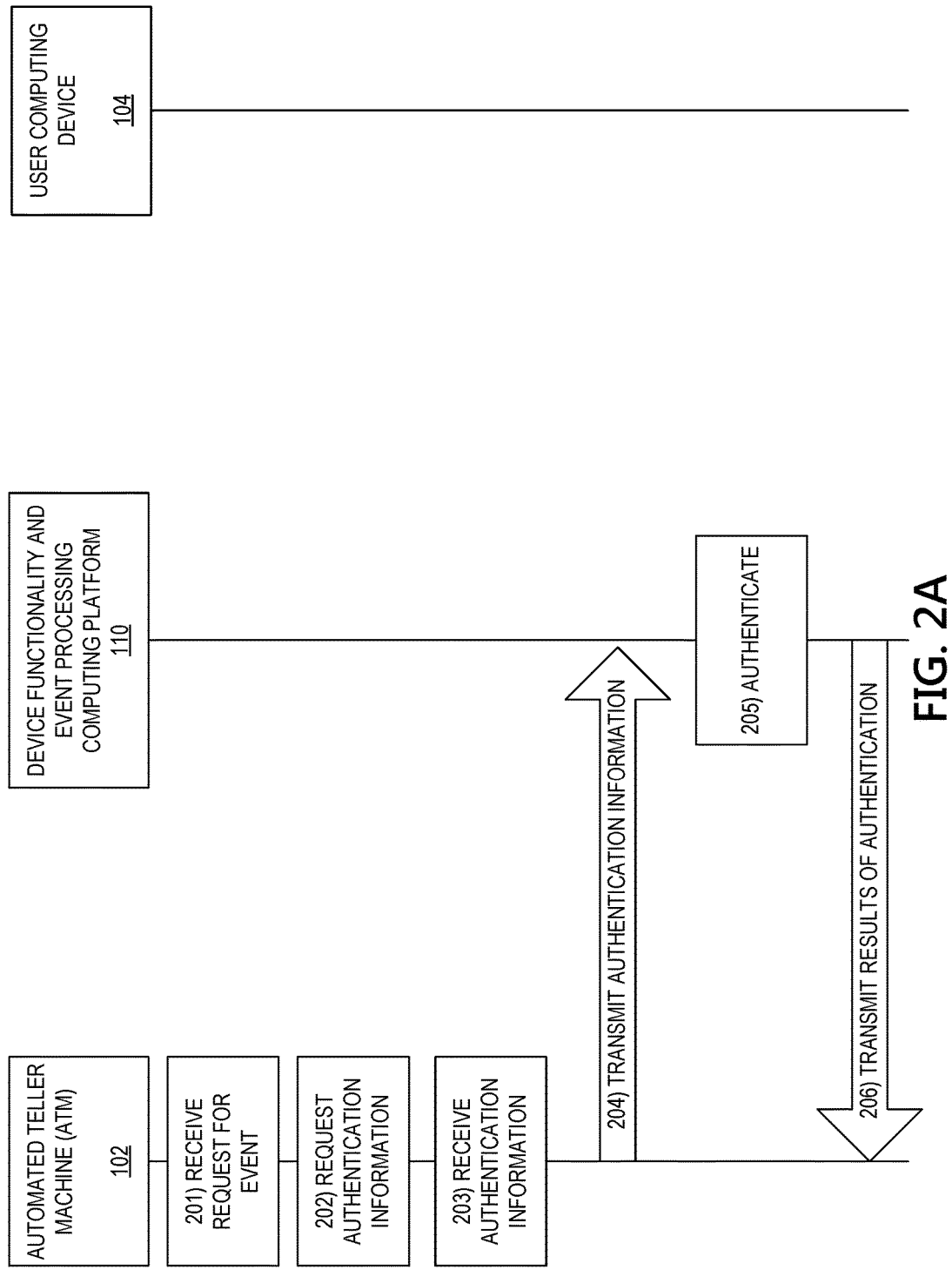

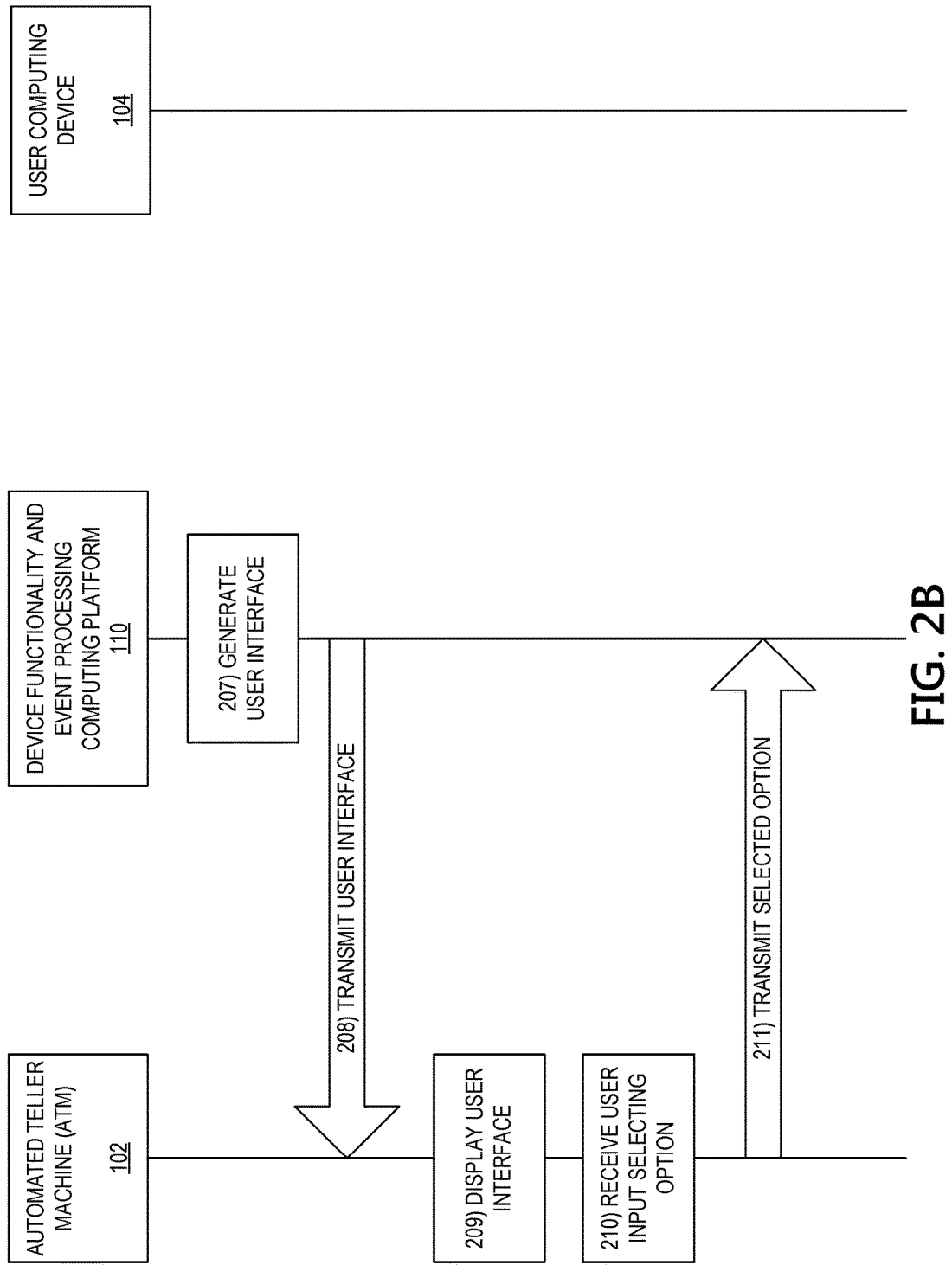

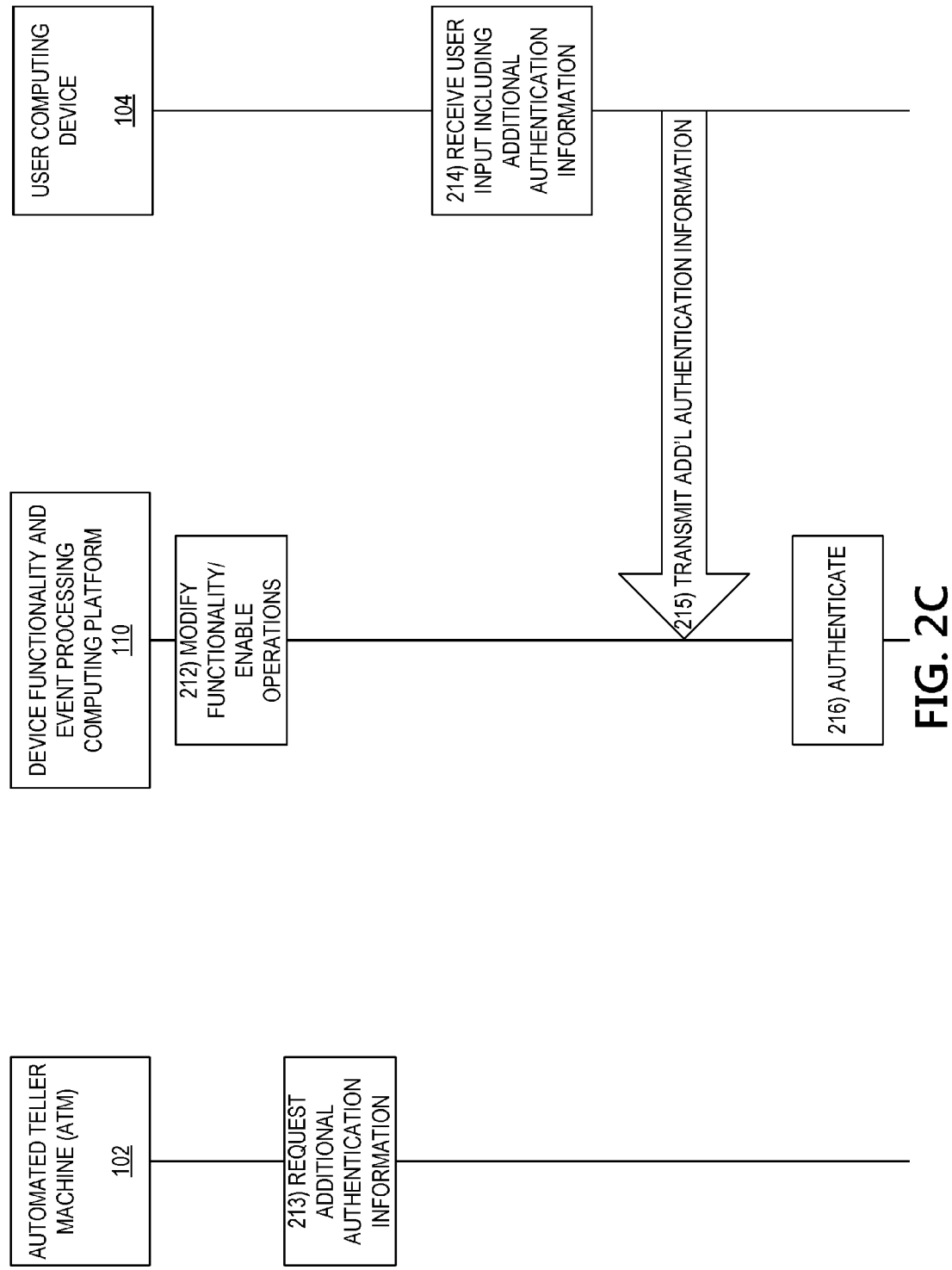

CONTROLLING DEVICE OPERATION BASED ON INTERACTION WITH ADDITIONAL DEVICE

BACKGROUND

Aspects of the disclosure relate to computer hardware and software. In particular, one or more aspects of the disclosure generally relate to computer hardware and software for modifying operation of a computing device to provide enhanced operations.

People are often looking to perform various tasks in a more efficient manner. For instance, when possible, people often use an automated system rather than working with a person to process an event because the wait is often shorter and, thus, the time spent in conducting the event may be reduced. This is often true for people conducting financial events. They often rely on automated devices to process various events in order to avoid waiting in line for an associate, and the like. However, conventional self-service devices often provide limited operations and/or include limits on the type of events, amount associated with events, and the like, that can be processed at the self-service device. Accordingly, it would be advantageous to provide enhanced operations at a self-service device.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to computer systems and arrangements that modify the functionality of a computing device, such as a self-service device, or the like. For instance, a user may initiate an event at the self-service device and, upon determining that the user is authorized to conduct events at the self-service device, the user may select an option to modify the operation of the self-service device to provide enhanced operations. The system may then modify the functionality of the self-service device to enable enhanced operations and may request second authentication information from the user. In some examples, the second authentication information may be provided via a mobile computing device of the user and may include, in some arrangements, biometric information of the user.

Upon authenticating the user with the second authentication information, the system may generate a user interface including enhanced operations available for selection. The system may then receive selection of an operation and may determine whether additional information is needed to process the operation. If so, the additional information may be requested and, in some examples, may be received from the mobile computing device of the user. For instance, the additional information may include an image of a photographic identification of the user. Upon receiving the additional information, the event/operation may be processed and the enhanced operations may be disabled to return the self-service device to a default operation mode.

In some examples, the second authentication information may include aspects related to confirming a location of a user. For instance, the second authentication information may include requesting a scan of a barcode or other machine readable code on the self-service device (e.g., via the mobile device of the user). In another example, a one-time use code may be transmitted to the mobile device of the user and the user may then input the one-time code use code into the self-service device to confirm the location of the user at the self-service device at which the enhanced operation is being requested.

In still other examples, selection of an enhanced operation may cause the system to call a pre-stored telephone number associated with the mobile device of the user. Alternatively, the system may request the user to input a telephone number into the self-service device and the system may then call the received number to further process the event.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for modifying operations of a computing device and processing an event according to one or more aspects described herein;

DETAILED DESCRIPTION

Figure 1:
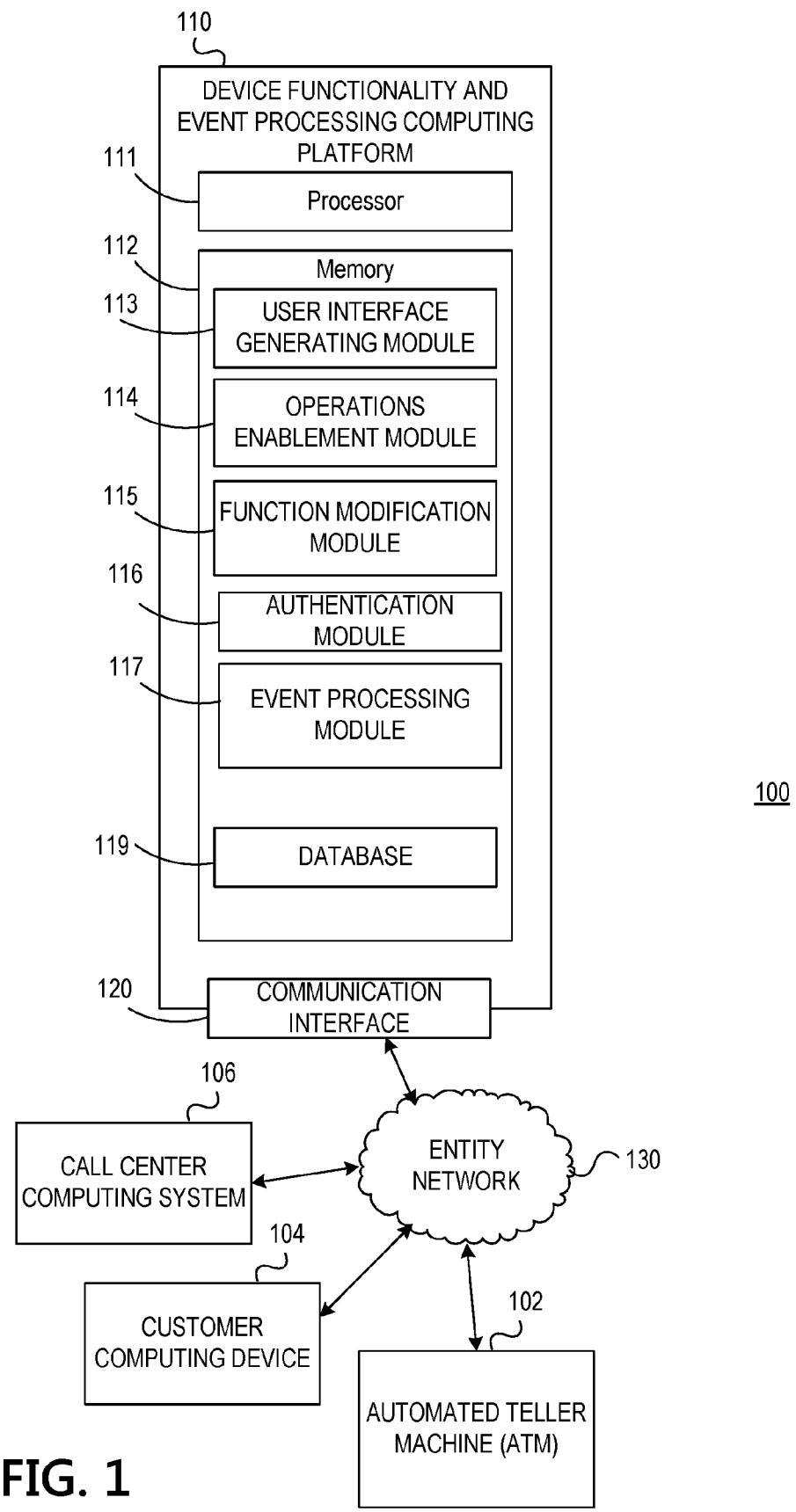
FIG. 1 depicts an illustrative device functionality and event processing computing platform according to one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, conventional self-service devices often provide limited functionality and/or limits to the types or amounts associated with events being processed at the self-service device. For instance, self-service devices often have a limit on an amount of funds that may be withdrawn from the machine (e.g., per day, per machine, or the like). Often, users would like to perform a transaction or event outside of the default operations provided by a self-service device or exceed the limits associated with the self-service device. However, performing those operations and/or exceeding the limits often requires interaction with an associate, providing additional information (e.g., documentation, photographic identification, or the like).

Accordingly, arrangements described herein are directed to modifying the functionality and/or operations offered by a self-service device and to processing the operations and/or events using information provided via another computing device, such as a mobile computing device of the user. In some examples, a user may initiate an event at the self-service device and may be authenticated at the self-service device (e.g., using a card and personal identification number (PIN) combination). The user may then select an option to receive enhanced operations. The system may then enable the enhanced operations that are disabled when the self-service device is operating in a default mode and may request second authentication information from the user. The second authentication information may include biometric data of the user provided via the mobile computing device of the user. Upon authenticating the user, the system may provide a plurality of enhanced operations available for selection.

Upon receiving selection of an enhanced operation, the system may determine whether additional information may be needed to process the requested operation. If so, the additional information (e.g., photographic identification, or the like) may be received from the mobile computing device of the user. The event or operation may then be processed and the system may then disable the enhanced operations and return the self-service device to a default operation mode.

Accordingly, the arrangements described herein enhance the function of a self-service device without requiring substantial hardware and/or other modifications to the self-service device (e.g., addition of scanners, cameras, or the like). Rather, the arrangements described herein rely on a second computing device, such as a mobile computing device of the user, to interact with the self-service device and/or other systems to process the event, as will be discussed more fully below.

These and various other arrangements will be discussed more fully herein.

FIG. 1 depicts an environment 100 including an illustrative computing platform for modifying device functionality and processing events according to one or more aspects described herein. For instance, the environment 100 includes a device functionality and event processing computing platform 110, which may include one or more processors 111, memory 112, and communication interface 120. A data bus may interconnect processor(s) 111, memory 112, and communication interface 120. Communication interface 120 may be a network interface configured to support communication between device functionality and event processing computing platform 110 and one or more networks (e.g., network 130). One or more computing or other devices 102, 104, 106 may be in communication with the device functionality and event processing computing platform 110 (e.g., via network 130). Memory 112 may include one or more program modules having instructions that when executed by processor(s) 111 cause the device functionality and event processing computing platform 110 to perform one or more functions described herein, and/or one or more databases 119 that may store and/or otherwise maintain information which may be used by such program modules and/or processor(s) 111. In some instances, the one or more program modules and/or databases may be stored by and/or maintained in different memory units of device functionality and event processing computing platform 110 and/or by different computer systems or devices that may form and/or otherwise make up the device functionality and event processing computing platform 110. In some arrangements, different features or processes performed may be performed by different sets of instructions, such that the processor may execute each desired set of instructions to perform different functions described herein.

Further, in some examples, the device functionality and event processing computing platform 110 may be part of one or more other computing devices, such as computing device 102, 104, 106, or the like. That is, the device functionality and event processing computing platform 110 may be a device separate from computing devices 102, 104, 106, and the like, and connected to or in communication with one or more of those devices, or the device functionality and event processing computing platform 110 may be part of a same device as one or more of devices 102, 104, 106, or the like.

Memory 112 may include a user interface generating module 113. The user interface generating module may include hardware and/or software configured to perform various functions within the device functionality and event processing computing platform 110. For instance, the user interface generating module 113 may generate one or more user interfaces that may be transmitted to one or more computing devices for display (or may be displayed by the device functionality and event processing computing device 110 when a display device is connected, available, or the like). The user interfaces generated by the user interface generating module 113 may provide one or more options available for selection by a user (e.g., user interfaces providing options for different events or functionality provided by a computing device, such as a self-service device or an automated teller machine (ATM) 102, mobile device 104 executing an on-line or mobile application, or the like. The user interfaces may be generated based on a type of functionality and/or type of operations enabled by the device, as will be discussed more fully herein.

Memory 112 may further include operations enablement module 114. Operations enablement module 114 may include hardware and/or software configured to perform various functions within the device functionality and event processing computing platform 110. For instance, the operations enablement module 114 may control which operations provided by a computing device are enabled or available for use/selection. In some examples, the operations enablement module 114 may control the functions or operations available at a self-service device or an ATM 102. That is, certain default operations may be available at self-service device or an ATM (e.g., deposit, withdrawal within a certain limit, check balance, or the like). However, the self-service device or ATM might be configured to provide additional functionality when requested and/or authorized. For example, a user may desire to perform an operation not listed in the default operations. Accordingly, the user may select an option for enhanced operations and the self-service device might be enabled, via the operations enablement module 114, to provide one or more enhanced operations or functions not previously provided in the default operations. In some examples, enabling one or more operations may include transmitting one or more instructions or signals to enable one or more functions that were previously disabled. Upon completion of an event at the computing device (e.g., self-service device, ATM, or the like), the operations enablement module 114 may disable the enhanced operations previously enabled in order to return the computing device to a default operating mode and provide the default operations to a next user of the device. Disabling the operations may include transmitting and/or executing an instruction to no longer provide one or more operations for use/selection.

In some examples, a function modification module 115 may also be included in the device functionality and event processing computing platform 110. The function modification module 115 may include hardware and/or software configured to perform one or more functions within the device functionality and event processing computing platform 110. For instance, the function modification module 115 may be configured to receive a request from a user to provide additional or enhanced operations or functionality and may process that request. In some examples, the request may be received via a user selecting an option on a computing device (e.g., ATM, self-service device, mobile device, or the like). Additionally or alternatively, the function modification module 115 may include voice monitoring and keyword recognition capabilities that will monitor a user at a self-service device or an ATM to detect a triggering event, such as a particular keyword, expression, or the like. In some examples, keywords such as "help," "assistance," "problem" or the like may be detected by the function modification module 115 (e.g., via a noise detecting device in the self-service device or other computing device) and may cause the function modification module 115 to process the keyword and cause the operations enablement module 114 to modify the operations provided by the self-service device (e.g., to include additional or enhanced operations not previously provided).

In other examples, the function modification module 115 may monitor a user for a string of terms, such as, "I need help," "what is wrong?" "I need to talk to someone," "why isn't this working?" and the like, to detect when a user might need enhanced functionality to complete processing an event. Accordingly, the function modification module 115 may monitor for these or other strings of terms and, upon detecting one or more strings of terms, may cause the operations enablement module 114 to modify functionality of the self-service device or ATM and/or provide enhanced operations at the self-service device or ATM.

Although various aspects described herein may be described in terms of an ATM, aspects described herein may be used with various other devices, such as mobile computing devices, automated teller assistants (ATA), self-service devices or kiosks, and the like, without departing from the invention.

Memory 112 may further include an authentication module 116. Authentication module 116 may include hardware and/or software configured to perform various functions within the device functionality and event processing computing platform 110. For instance, the authentication module 116 may be used to authenticate a user upon initiating an event at a computing device, such as a self-service device or an ATM. In some examples, an event may include a transaction, request for information, or other operation requested at the self-service device or ATM.

For instance, a user may insert his or her ATM card, debit card, or other device, in order to initiate an event. Upon receiving the card, data may be read by the ATM (e.g., from a magnetic strip on the card, from a chip embedded in the card, or the like). The data may be used to retrieve user information, such as from database 119. The user information may include a pre-stored personal identification number (PIN). The ATM may request the user to input his or her PIN and the authentication module may determine whether the PIN received from the user matches the pre-stored PIN retrieved from the database. If so, the user may be authenticated. If not, the user may be requested to re-enter his or her PIN or seek assistance.

In some arrangements, upon enabling additional or enhanced operations or functions at the ATM, additional authentication information may be requested from a user. For instance, biometric data such as a fingerprint, iris scan, voice print matching, or the like, may be used to further authenticate a user in order to process an enhanced operation or event. In some examples, the authentication module 116 may cause a request for additional authentication information to be displayed on a display of the ATM. The request may include a request for a user to input biometric information, additional personal information such as a password, unique identifier, or the like, via a second computing device different from the ATM. For example, the user may be requested to provide the information via his or her mobile device 104. Accordingly, the user may provide the biometric or other authenticating information to his or her mobile device 104 and the mobile device 104 may then transmit the received data to the authentication module 116 for authentication (e.g., comparison and/or matching with pre-stored biometric data or other authentication information stored in and retrieved from database 119). In some examples, the received biometric (or any other received authentication data) may be transmitted to the device via one or more close proximity communication protocols, such as BLUETOOTH WiFi, near field communication, and the like.

Various other methods of authenticating a user may also be used. For instance, upon requesting enhanced operations, the authentication module 116 may transmit a one-time use code to a pre-stored mobile device 104 number (e.g., retrieved from database 119) of the user. The one-time use code may be displayed on a display of the mobile device 104 and the user may be requested to input the one-time use code into the ATM. Upon receipt of the user input, the authentication module 116 may determine whether the received user input matches the generated one-time use code. If so, the user may be authenticated. If not, the user may be requested to provide additional authenticating information or seek assistance.

Memory 112 may further include an event processing module 117. The event processing module 117 may include hardware and/or software configured to perform various functions within the device functionality and event processing computing platform 110. For instance, the event processing module 117 may receive user input selecting an event to process (e.g., type of transaction, or the like) and may determine whether additional information may be needed to process that event or type of event. If so, the event processing module 117 may identify a type of additional information need and may transmit a request to the user for the additional information. The event processing module 117 may cause the request for additional information to be displayed on the display of the self-service device or ATM.

In some examples, the user may use his or her mobile device 104 to provide the additional information for processing the event. For instance, if the event requires an image of a user's driver's license to process the event, the user may capture an image of his or her driver's license with the image capturing functionality of a camera on the mobile device 104 and may transmit the image to the event processing module 117. In another example, additional information may include other information the user can provide, such as a unique identification number of the user, current address, account number, or the like. In some arrangements, the event processing module 117 may cause a telephone number to be displayed on the display of the self-service device or ATM. The user may call the number with his or her mobile device 104 and speak to an operator, such as a call center operator working from a call center computing system 106, and provide the information. In another example, the event processing module 117 may instruct the call center computing system 106 (e.g., via network 130) to initiate a call to a pre-stored number of the mobile device 104. The call may then connect a user to a call center operator to provide any necessary information.

Once the desired information is received, the event processing module 117 may connect to and/or communicate with various other systems within an entity, such as a financial institution, to process the event (e.g., complete the transaction, process a deposit, provide funds for a withdrawal, and the like).

One or more aspects described herein with respect to use of a mobile device 104 for providing information, functionality and the like may be performed by an on-line or mobile application downloaded or otherwise provided to the mobile device 104 and executing on the mobile device 104.

FIGS. 2A-2E illustrate one example event sequence for modifying device functionality and processing events in accordance with one or more aspects described herein. The sequence illustrated in FIGS. 2A-2E is merely one example sequence and various other events may be included, or events shown may be omitted, without departing from the invention.

With reference to FIG. 2A, in step 201, a request for an event may be received by a computing device, such as self-service device or ATM 102. The request for an event may be an initiation of any operation at the self-service device or ATM. For instance, the request for the event may include inserting a user's ATM or other card into the self-service device or ATM to initiate an event (e.g., transaction, process, operation, or the like). In step 202, the ATM may request authentication information. For instance, the self-service device or ATM may request that a user provide his or her PIN in order to further execute the event. Although a PIN is described in this example, various other types of authentication information may be used, such as a password, other unique identifier, or the like.

In step 203, authentication information may be received from a user and, in step 204, the received authentication information may be transmitted to the device functionality and event processing computing platform 110 (e.g., for processing by, for instance, the authentication module 116). In step 205, the user may be authenticated by, for instance, matching the received authentication information to pre-stored authentication information stored in a database 119 of the device functionality and event processing computing platform 110. In step 206, the results of the authentication process may be transmitted to the self-service device or ATM and the device functionality and event processing computing platform 110 may cause the results to be displayed on a display of the ATM.

With reference to FIG. 2B, in step 207, a user interface may be generated by the device functionality and event processing computing platform 110. For instance, the user interface generating module 113 may generate a user interface including a first plurality of options available for selection. The first plurality of options may represent a default level of functionality or default operations provided by the ATM. In step 208, the user interface may be transmitted to the self-service device or ATM and, in step 209, the device functionality and event processing computing platform 110 may cause the user interface to be displayed on a display of the self-service device or ATM.

In step 210, the self-service device or ATM may receive user input selecting an option from the first plurality of options displayed on the user interface. In some examples, the selected option may be a selection requesting enhanced functionality or operations of the self-service device or ATM. For instance, the selection may request operations that are not typically available in a default functionality mode of the self-service device or ATM. Rather, the in order to access one or more enhanced options the functionality of the self-service device or ATM may be modified to enable the enhanced functions or operations. In some examples, the option to access enhanced options or enable enhanced functionality of the self-service device or ATM may only be provided to certain users. For instance, in some examples, only users having an account with the entity associated with the self-service device or ATM may view and/or select the option for enhanced functionality. In other examples, only certain levels of customer (e.g., those having longstanding relationships with the entity, those having multiple accounts, or the like) may view and/or select the enhanced functionality option. In still other examples, all users accessing the self-service device or ATM may be able to view and/or select the option. In step 211, the selected option may be transmitted to the device functionality and event processing computing platform 110.

With reference to FIG. 2C, in step 212, the functionality of the self-service device or ATM may be modified to enable additional enhanced operations. For instance, the function modification module 115 of the device functionality and event processing computing platform 110 may detect selection of an option to provide enhanced operations. Based on this selection, the function modification module 115 may transmit an instruction to the operations enablement module 114 to modify functionality of the self-service device or ATM by enabling additional operations that were not previously available for selection or use (e.g., under a default mode of operation).

In step 213, additional user authentication information may be requested via the self-service device or ATM. In some examples, the additional user authentication information (and processing of the received information including at least steps 213-217) may be performed prior to enabling enhanced operation. In other examples, enhanced operation may be enabled however, prior to providing any enhanced operations to the user for selection, additional authentication steps 213 to 217 may be performed.

In step 214, the requested additional information may be received by a user computing device 104, such as a mobile device of the user. In some examples, the requested information may be provided via an on-line or mobile application associated with the entity associated with the self-service device or ATM and executing on the computing device 104. In some examples, the requested additional authentication information may include biometric data, such as a voice print, finger print, iris scan, or the like. This information may be received by the computing device 104 (e.g., via a finger print scanner, iris scanning feature of the on-line or mobile application, via a microphone in the device, or the like). Additionally or alternatively, the requested additional authentication information may include a password or additional username and password combination, or the like.

The received additional authentication information may be processed by the computing device 104 (e.g., by the on-line or mobile application executing on the device 104) and the data may be transmitted to the device functionality and event processing computing platform 110 in step 215. For instance, the data may be transmitted to authentication module 116 for further processing. In step 217, the authentication module 116 may authenticate the user by comparing the received additional authentication information to pre-stored authentication information.

Various other methods and processes for authenticating users may be used without departing from the invention and will be discussed more fully herein.

Figure 2D:
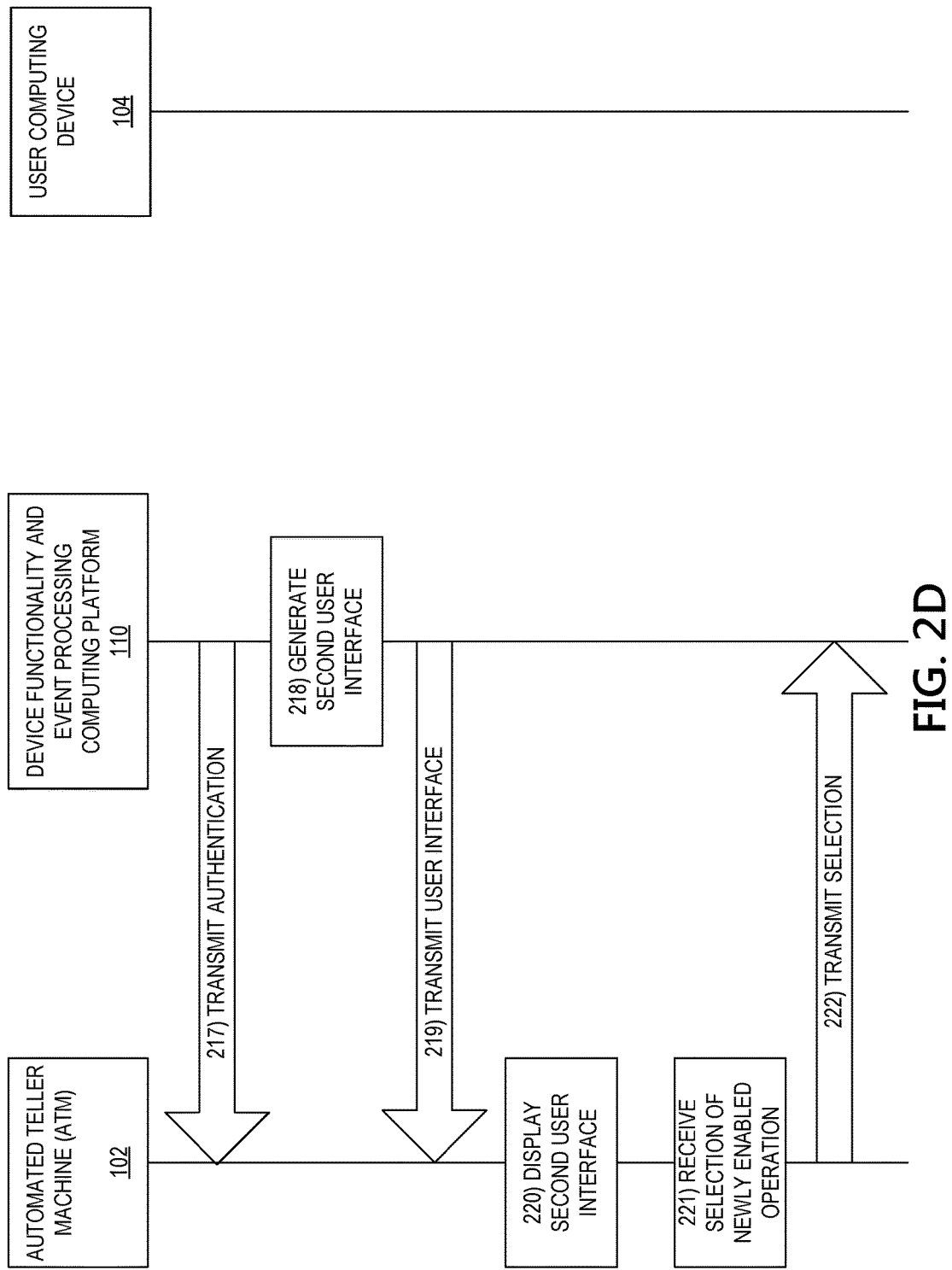

With reference to FIG. 2D, in step 217, the results of the authentication may be transmitted to the self-service device or ATM. If the user is authenticated, in step 218, a second user interface may be generated by the device functionality and event processing computing platform 110. For instance, user interface generating module 113 may generate a second user interface providing second options for selection, the second options including enhanced operations available for selection that were not previously available in the first user interface (e.g., because the functionality was disabled when the self-service device or ATM is operating in a default mode). In some examples, the user interface generating module 113 may generate the second user interface in response to receiving an instruction from the authentication module 116 that the user has been authenticated.

In step 219, the second user interface may be transmitted to the self-service device or ATM and, in step 220, the device functionality and event processing computing platform 110 may cause the second user interface to be displayed on a display of the self-service device or ATM. In step 221, the self-service device or ATM may receive user input selecting an enhanced operation from the enhanced operations provided in the second user interface. In step 222, the selected option may be transmitted to the device functionality and event processing computing platform 110 (e.g., to the event processing module 117.

Figure 2E:
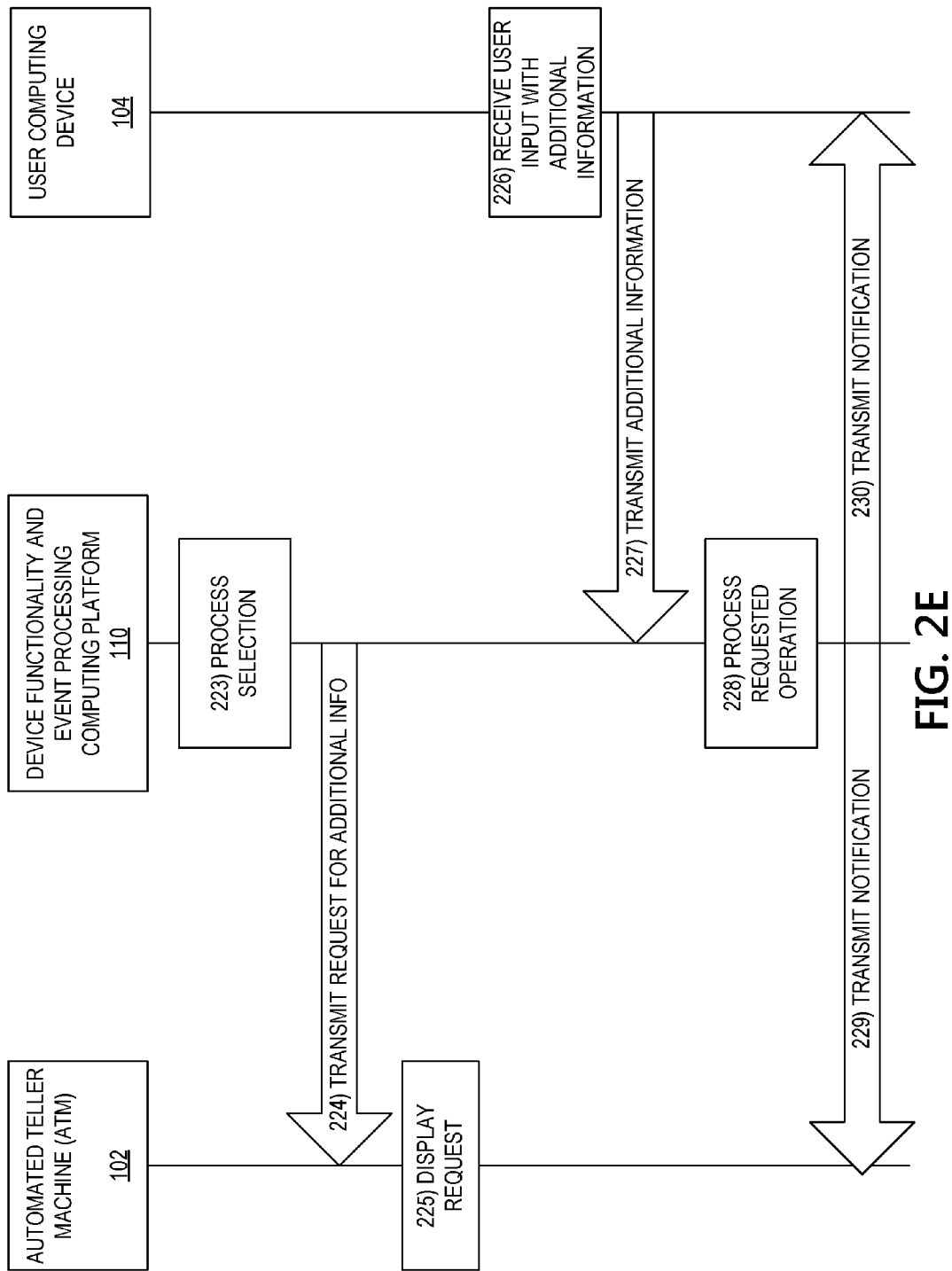

With reference to FIG. 2E, in step 223, the received selection may be processed, such as by the event processing module 117. The event processing module 117 may determine that additional information is needed to process the event. For instance, additional information such as an image of a driver's license, a confirmation of an account number, a confirmation of a unique identifier associated with the user, or the like may be needed in order to process the event, type of event, or the like. Accordingly, in step 224, a request for additional information may be transmitted to the self-service device or ATM and, in step 225, the device functionality and event processing computing platform 110 may cause the request to be displayed on a display of the self-service device or ATM.

In step 226, the requested additional information may be received via the user computing device 104. For instance, if the requested additional information includes an image of the user's driver's license, the user may capture an image of the license using the camera or other image capturing functionality of the computing device 104. In some examples, collection of additional information may be facilitated by an on-line or mobile application associated with the entity associated with the self-service device or ATM and executing on the mobile device 104. For instance, the application may provide instructions for capturing and/or providing the requested additional information.

In step 227, the received additional information may be transmitted to the device functionality and event processing computing platform 110 (e.g., to the event processing module 117). In step 228, the event processing module 117 may process the request and, in steps 229 and 230, a notification may be transmitted to the self-service device or ATM 102 and computing device 104, respectively, indicating that the event has been processed.

FIGS. 3A-6B illustrate additional example processes of enabling enhanced operation of a mobile device based on interactions with an additional device. The various steps and processes discussed with respect to each figure may be performed in an order other than the one illustrated in the figures and one or more steps of processes may be used in combination with one or more other steps or processes shown in other figures. Nothing in the figures or associated specification should be viewed as limiting the steps of the processes described to only use in a particular order or to only use with the other steps shown and described in the respective figure of the step.

Figure 3A:
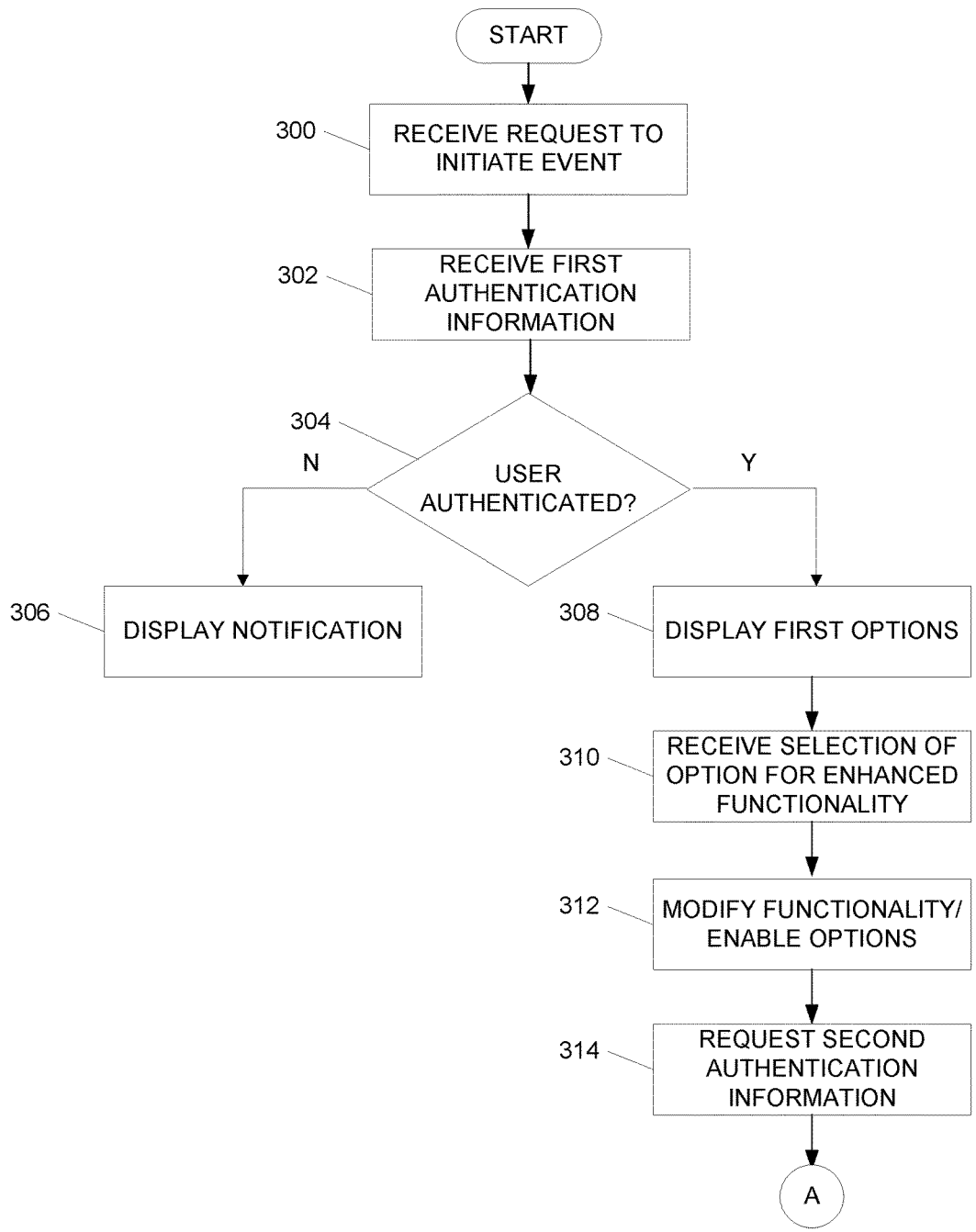
FIGS. 3A and 3B depict one example method of modifying operations of a device and processing an event according to one or more aspects described herein.
Figure 3B:
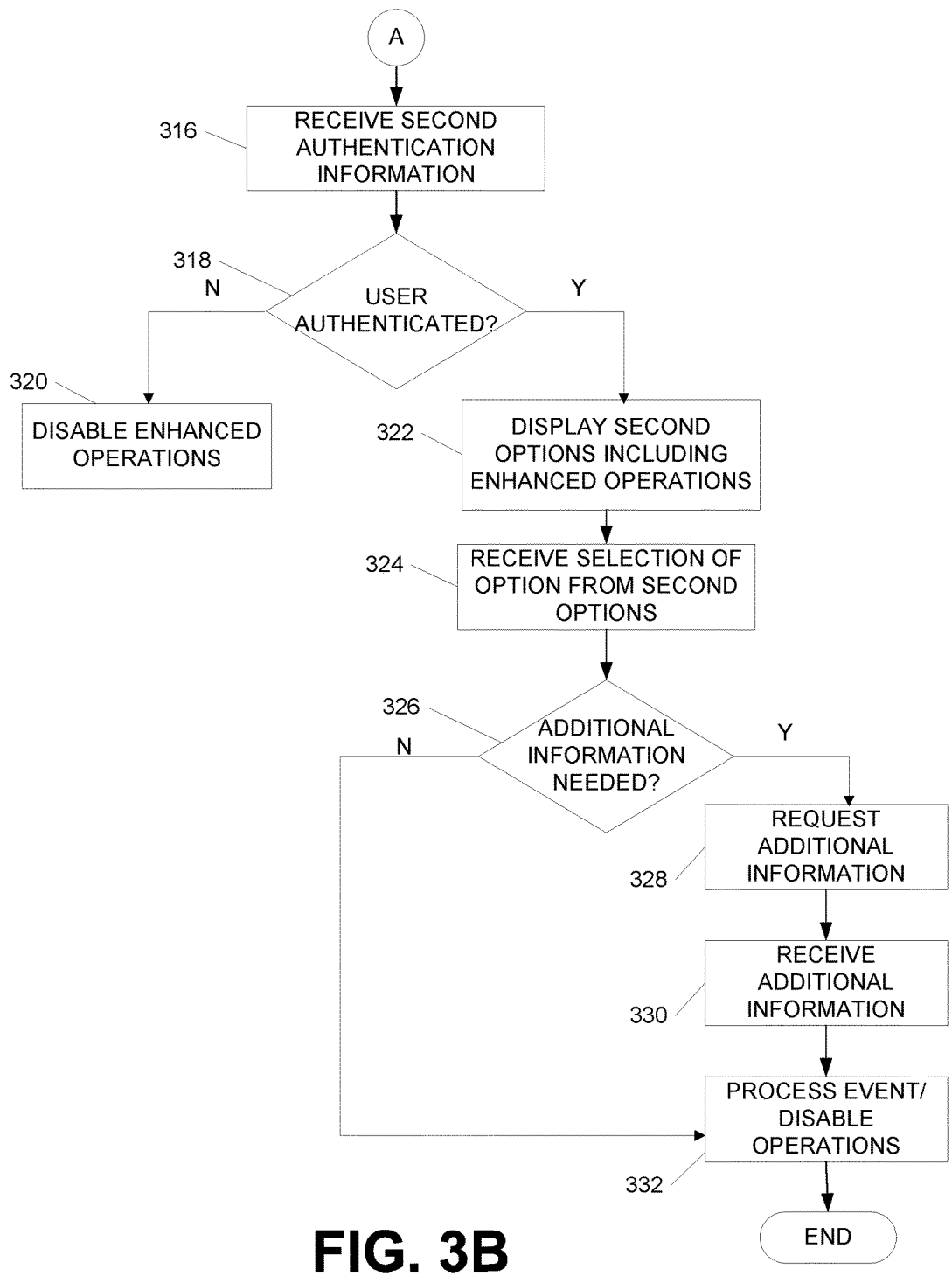

FIGS. 3A and 3B illustrate one example method of modifying functionality of a device and processing an event according to one or more aspects described herein. In step 300, a request to initiate an event may be received. As discussed herein, an event may include one or more operations performed at a computing device, such as a self-service device or an ATM. Some example events include transactions such as withdrawals, deposits, and the like, a request for a balance of an account, or the like. Various other events may be processed by the computing device without departing from the invention.

Initiating the event may include inserting, for instance an ATM card, debit card, or the like, into the computing device. In other examples, initiating an event may include selecting a "start" option on a display screen. Various other methods of initiating an event may be used without departing from the invention.

In step 302, first authentication information may be received. In some examples, the first authentication information may be received in response to a request for authentication information displayed on a display of the computing device (e.g., self-service device or ATM). In some examples, the authentication information may include a PIN, password, unique identifier, or other authenticating information.

In step 304, the first authentication information may be received and process (e.g., by the device functionality and event processing computing platform 110) and a determination may be made as to whether the user is authenticated. In some examples, determining whether the user is authenticated may include retrieving data associated with the user based on data read from a device (e.g., ATM card, debit card, or the like) used to initiate the event. For instance, data may be read from a magnetic strip on the device, from a chip embedded in the device, or the like. The data retrieved from the magnetic strip, chip, or the like, may be processed and used to retrieve information associated with a user associated with the card or device. For instance, user information may be retrieved from a database and the user information may include pre-stored authentication information. This pre-stored authentication information may be compared to the authentication information received in step 302 to determine whether it matches and, accordingly, whether the user is authenticated.

If, in step 304, the user is not authenticated, a notification may be displayed to the user and the process may end. The notification may indicate that the authentication information was incorrect and may instruct the user to initiate a new transaction to try again, seek assistance, or the like.

If, in step 304, the user is authenticated, a first plurality of options may be displayed to the user via a display of the self-service device or ATM in step 308. The first plurality of options may include default options and the self-service device or ATM may be operating in a default mode with default or standard operations available for selection. In step 310, user input may be received selecting one option of the plurality of options. In some examples, the selected option may be an option to provide enhanced operations or modify the functionality of the self-service device or ATM.

In step 312, the functionality of the self-service device or ATM may be modified to enable one or more enhanced operations that were not previously enabled (e.g., were disabled in a default operation mode).

In step 314, second authentication information may be requested. For instance, in order to provide one or more enhanced operations to a user, the system may request a second, additional authentication of the user. With reference to FIG. 3B, in step 316, second authentication information may be received. In some examples, the second authentication information may include a password, re-entry of a user's PIN, biometric data (e.g., voice print, finger print, iris scan, or the like), providing an answer to one or more pre-determined security questions, or the like. In some examples, the second authentication information may be provided via a second computing device different from the first computing device (e.g., the self-service device or ATM). For example, the additional authentication information may be provided via a mobile computing device of the user. In some arrangements, providing the information to the device may be facilitated by an on-line or mobile application executing on the mobile computing device and configured to communicate with and/or connect to the device functionality and event processing computing platform.

In step 318, a determination is made as to whether the user is authenticated. Similar to the process of step 304, the received second authentication information may be compared to pre-stored authentication information that may be retrieved from a database (e.g., based on the data read from the card or device associated with the user). If, in step 318, the user is not authenticated, the enhanced operations of the self-service device or ATM may disabled and the self-service device or ATM may return to a default operation mode (e.g., in which the enhanced operations are not enabled and are not available) in step 320.

If, in step 318, the user is authenticated, a second plurality of options may be displayed to the user in step 322. The second plurality of options may include enhanced operations that were disabled under the default operation mode. In step 324, user input selecting an enhanced operation from the second plurality of options may be received. The selection may be processed and, in step 326, a determination may be made as to whether additional information is needed to process the selection. If not, the selected option may be processed in step 332.

If additional information is needed in step 326, in step 328, the self-service device or ATM may display a request for the additional information. In step 330, the additional information may be received. In some examples, the additional information may be provided via the other computing device (e.g., the mobile computing device of the user) and may be transmitted to the device functionality and event processing computing platform. In some examples, the requested additional information may include an image of a user's driver's license or other photographic identification, an image of a statement or other document associated with the event, and the like. The user may capture the image using a camera of the mobile device of the user and the image may be transmitted to the device functionality and event processing computing platform for further processing in step 332. Upon completion of the event processing, the device modification and event processing computing platform may disable the enhanced operations and the self-service device or ATM may return to a default mode in which default operations are enabled and enhanced operations are disabled.

Figure 4A:
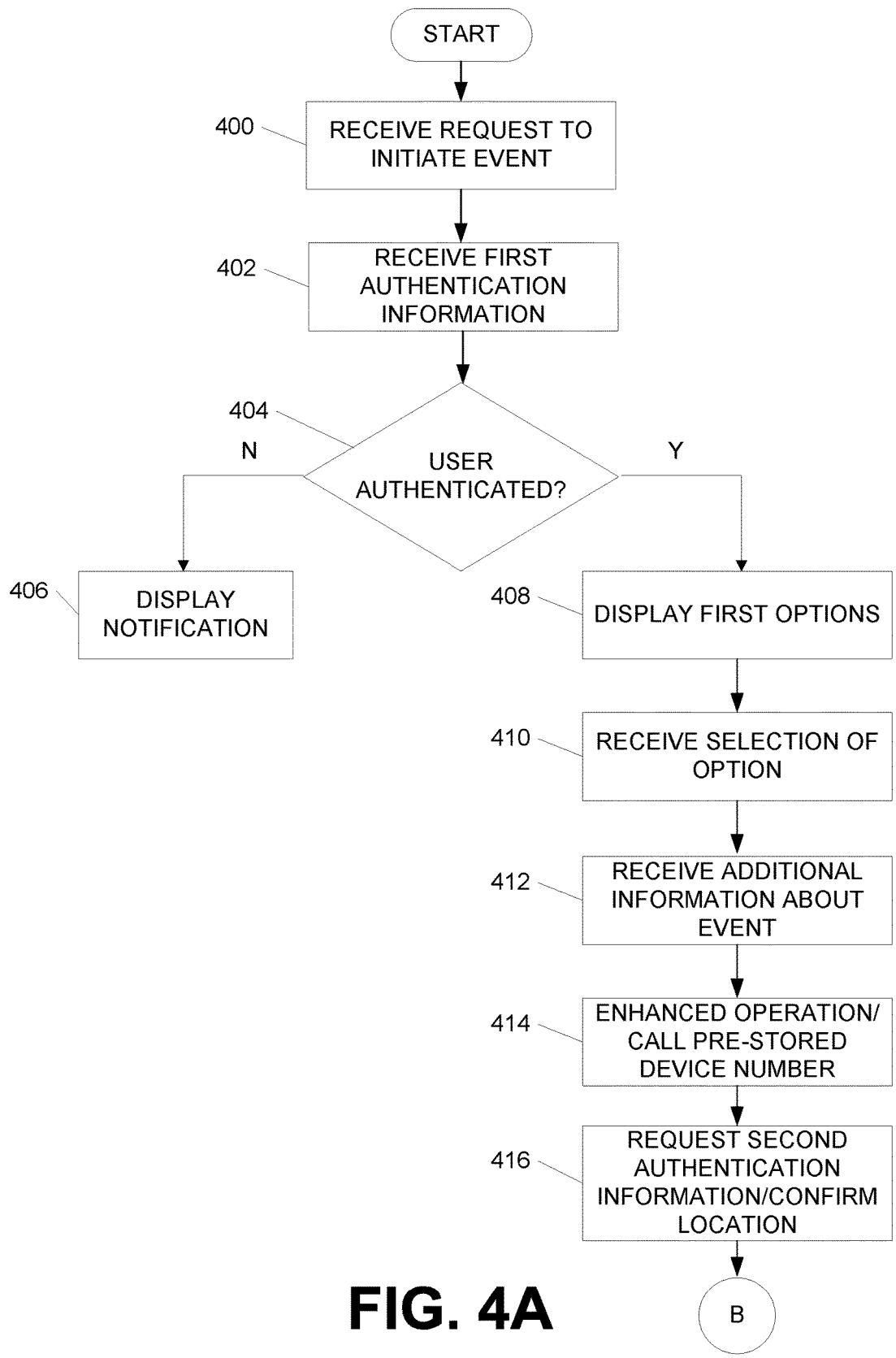
FIGS. 4A and 4B illustrate another example method of modifying operations of a computing device and processing an event according to one or more aspects described herein.
Figure 4B:
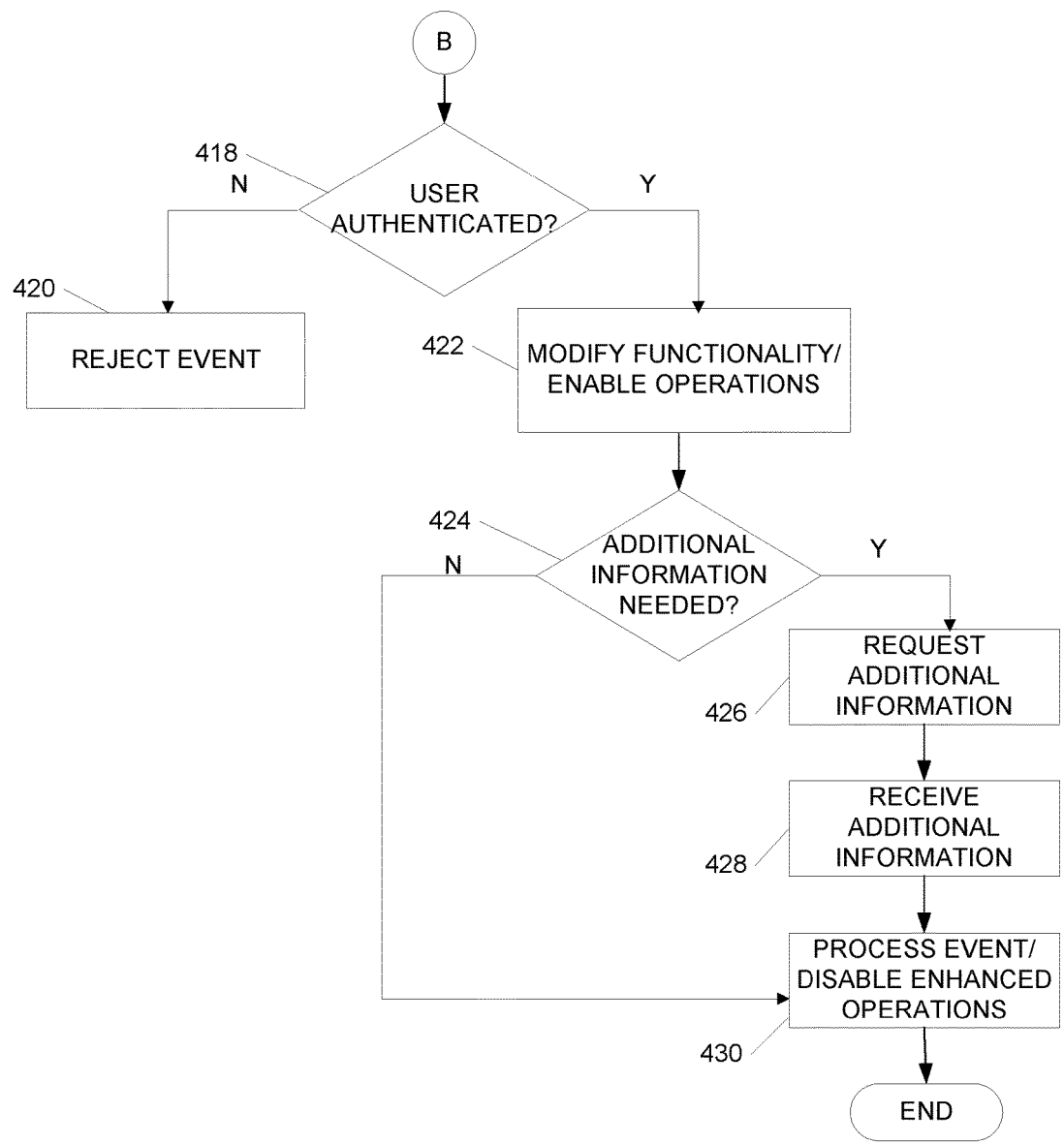

FIGS. 4A and 4B illustrate another example method of modifying device functionality and processing an event according to one or more aspects described herein. In step 400, a request to initiate an event may be received. Similar to step 300 in FIG. 3A, the request to initiate the event may include inserting a card into a computing device, such as a self-service device or an ATM, or other form of initiating an event (e.g., select "start" button, make selection from display screen, and the like). As discussed above, events may include various types of transactions, requests for balance information, processing an inquiry, or the like.

In step 402, first authentication information may be received. Similar to step 302 in FIG. 3A, the first authentication information may be received in response to a request displayed on a display of the self-service device or ATM. The first authentication information may include a PIN, password, or other authentication information, as discussed herein. In step 404, the received authentication information may be processed to determine whether the user is authenticated. The process of authenticating the user may be similar to the process described above (e.g., with respect to step 304 in FIG. 3A, and the like). If the user is not authenticated in step 404, a notification may be displayed to the user on the display of the self-service device or ATM in step 406.

Alternatively, if the user is authenticated in step 404, a first plurality of options may be displayed to the user in step 408. The first plurality of options may include default options associated with default functionality enabled in the self-service device or ATM (e.g., enhanced functionality and operations may be disabled). In step 410, selection of an option from the first plurality of options may be received. In some examples, the selection may request additional information (e.g., an amount of withdrawal, type of inquiry, or the like). The user may input this additional information in step 412.

In step 414, the system may determine that, based on the received additional information and the selected option, the event may require enhanced operation of the self-service device or ATM in order to be processed. Accordingly, the system (e.g., the device functionality and event processing computing platform) may contact the user (e.g., via a mobile device of the user). In one example, the device functionality and event processing computing platform may transmit an instruction to a call center computing system to contact the user via a pre-stored number associated with the mobile device of the user. Accordingly, the call center computing system may attempt to connect with the mobile device (via a cellular network). In some examples, upon a connection being made, the call center computing system may initiate an automated service to assist the user. In another example, upon a connection being made, the call center computing system may transfer the call to a call center operator to assist the user.

In step 416, the system (e.g., the device functionality and event processing computing platform via the call center computing system/call center operator) may request additional authentication information. As discussed herein, additional authentication information may include biometric data, an additional or re-entry of a PIN, password, or the like. As also discussed herein, this information may be captured and/or transmitted to the device functionality and event processing computing platform via the mobile device of the user.

In another example, a user may be requested to scan a barcode, quick response (QR) or other machine-readable code arranged on the self-service device or ATM in order to authenticate that the user on the call is the user located at the self-service device or ATM and requesting the event. Accordingly, the user may capture the machine-readable code with an application executing on the user's mobile device and the captured image may be read and transmitted to the device functionality and event processing computing platform. The device functionality and event processing computing platform may compare the captured data to pre-stored data associated with a location of the self-service device or ATM engaged in processing the event to determine whether there is a match. A match may indicate confirmation of the user's location and may act as an additional form of authentication.

In yet another example, the mobile device of the user may detect a signal emitted from a locating beacon arranged within the self-service device or ATM or within a predefined proximity of the self-service device or ATM. Accordingly, upon detecting the locating beacon signal, a notification may be transmitted from the mobile device of the user to the device functionality and event processing computing platform (e.g., via an on-line or mobile application executing on the mobile device) that the device is within a pre-determined range or distance of the locating beacon. Receipt of the notification may act as confirmation of the user's location and/or as an additional form of authentication.

In still another example, the device functionality and event processing computing platform may transmit, to a pre-stored telephone number associated with a mobile device of the user (e.g., retrieved from the database and based on, for example the data read from the card, authentication information, and the like), a one-time use code. The user may receive the one-time use code via his or her mobile device and may input the one-time use code into the self-service device or ATM. If the one-time use code received by the self-service device or ATM matches the generated one-time use code transmitted to the mobile device, the user may be considered authenticated and/or his or her location may be considered confirmed.

In still another example, the user may be requested to provide an image of his or her photographic identification as second authentication information. The user may capture an image of the identification using his or her mobile device and the image may be geo-tagged with location information associated with a current location of the mobile computing device. Upon receiving the image and the embedded geo-tag information, the system may confirm an identity of the user and may confirm a location of the user relative to the self-service device or ATM at which the event is being processed based on the received geo-tagged location information.

Upon receiving the second authentication information and/or confirming location of the user, the system may determine whether the user is authenticated in step 418. If not, the requested event may be rejected in step 420. If, in step 418, the user is authenticated, the functionality of the self-service device or ATM may be modified in step 422 and/or enhanced operations may be enabled. This may enable the self-service device or ATM to process the requested event which was identified as an enhanced operation that was not available/enabled in default mode.

In step 424, a determination is made as to whether additional information is needed to process the requested enhanced operation. If not, the event may be processed in step 430. If so, in step 426, additional information may be requested. As discussed above, the additional information may be documentation, photographic identification, or the like, that may be captured by the mobile computing device of the user and transmitted to the device functionality and event processing computing platform for processing. In step 428, the requested additional information may be received and in step 430, the event may be processed and the enhanced operations that were enabled in step 422 may be disabled to return the self-service device or ATM to a default operation mode.

Figure 5A:
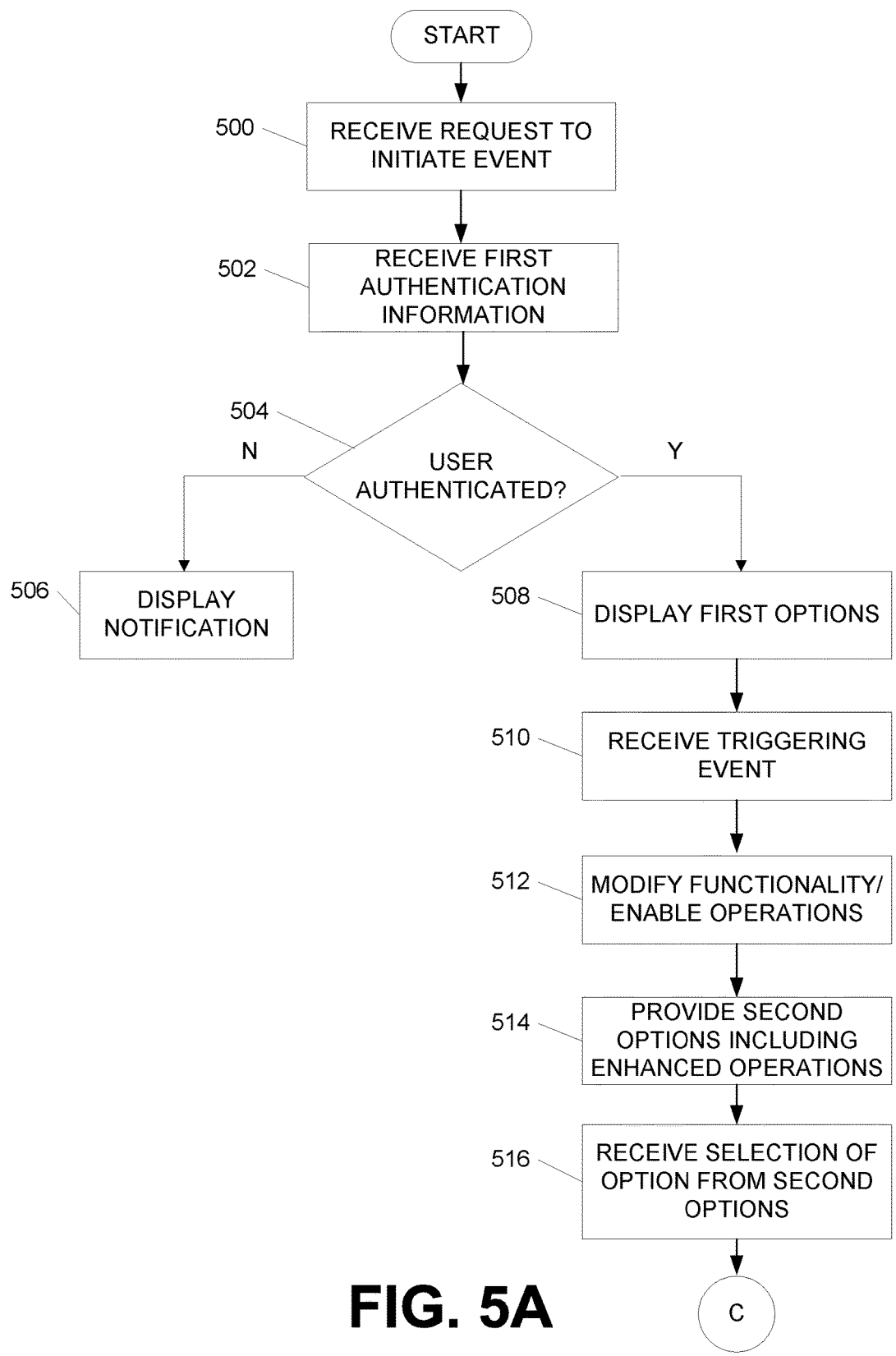
FIGS. 5A and 5B illustrate yet another example method of modifying operations of a computing device and processing an event according to one or more aspects described herein.
Figure 5B:
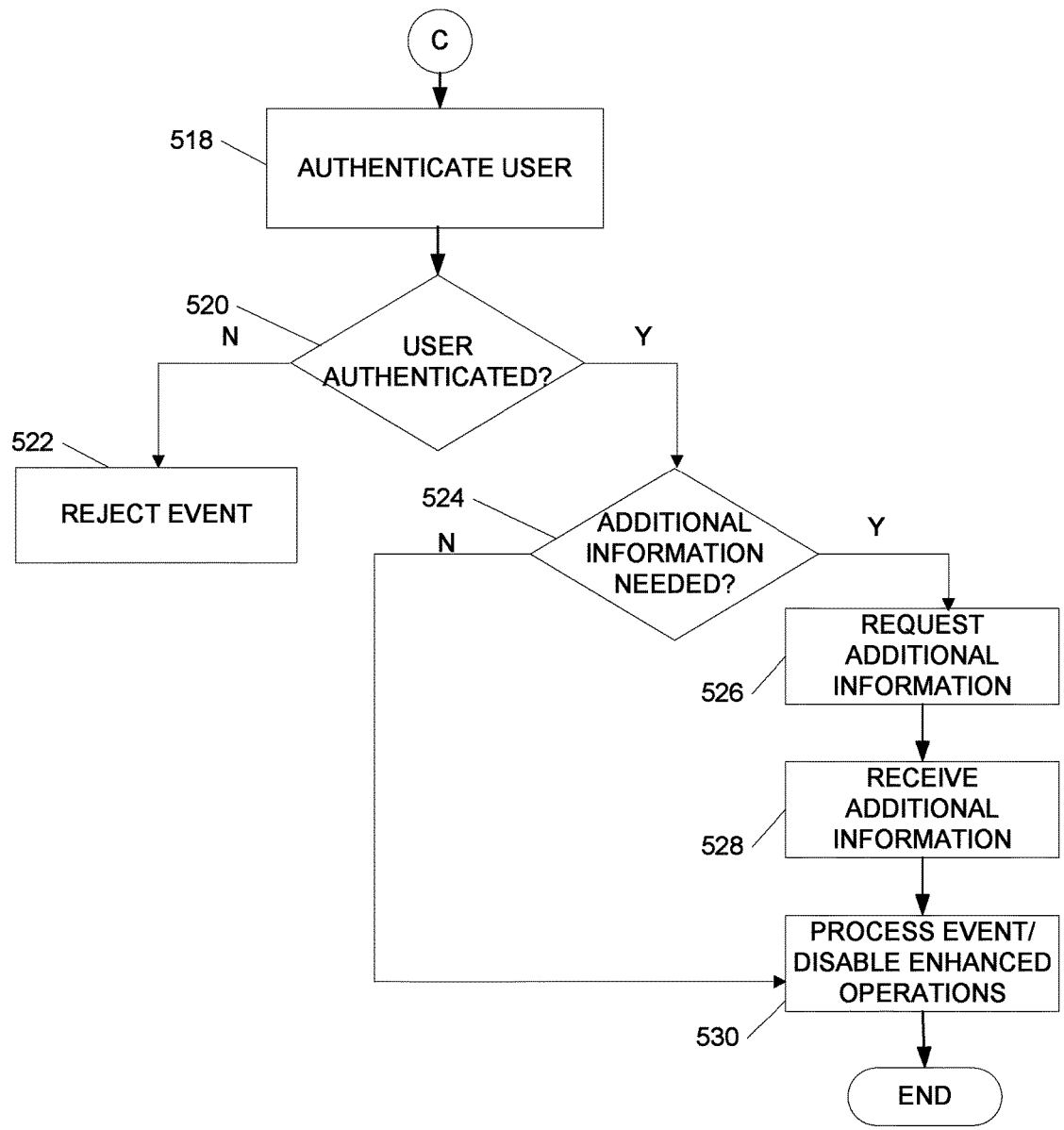

FIGS. 5A and 5B illustrate yet another example method of modifying device functionality and processing events according to one or more aspects described herein. In step 500, a request to initiate an event may be received. Similar to steps 300 in FIG. 3A and 400 in FIG. 4A, the request to initiate an event may include inserting a card into a computing device (e.g., ATM), selecting a "start" option, or the like. In step 502, first authentication information may be received. Similar to steps 302 in FIG. 3A and 402 in FIG. 4A, the first authentication information may include a PIN, password, or the like.

In step 504, a determination is made as to whether the user is authenticated. Determining whether the user is authenticated may be performed similarly to the determination performed in steps 304 in FIG. 3A and 404 in FIG. 4A. If the user is not authenticated in step 504, a notification may be displayed to the user in step 506.

If, in step 504, the user is authenticated, a first plurality of options may be displayed to the user in step 508. The first plurality of options may be associated with default operations provided by the self-service device or ATM while in a default mode (e.g., enhanced operations are disabled). In step 510, a triggering event may be received. In some examples, the triggering event may include keyword recognition of one or more spoken terms or strings of terms provided by the user at the self-service device or ATM. For instance, the system may detect an occurrence of the term "help" or "assistance." In another example, the system may detect an occurrence of the string of terms "what is wrong?" or "this isn't working." Detection of a keyword or string of terms may then cause the self-service device or ATM to modifying functionality and/or enable enhanced operations in step 512. As discussed herein, modifying functionality and/or enabling enhanced operations may include enabling functions or operations of the self-service device or ATM that were disabled in a default operation mode.

In step 514, the system may provide a second plurality of options for selection including one or more enhanced operations enabled by the system. In step 516, the user may select one or more options from the second plurality of options. With reference to FIG. 5B, the user may then provide additional or second authentication information in step 518, similar to various arrangements described herein.

In step 520, a determination is made as to whether the user is authenticated. The process may be similar to other authentication processes described herein. If the user is not authenticated, the requested event may be rejected in step 522. If, in step 520, the user is authenticated, a determination may be made in step 524 as to whether additional information is needed. If not, the event may be processed in step 530. If so, the additional information may be requested in step 526 and received in step 528, similar to various arrangements described herein. In step 530, the event may be processed and the enhanced operations may be disabled to return the self-service device or ATM to a default mode of operation.

Figure 6A:
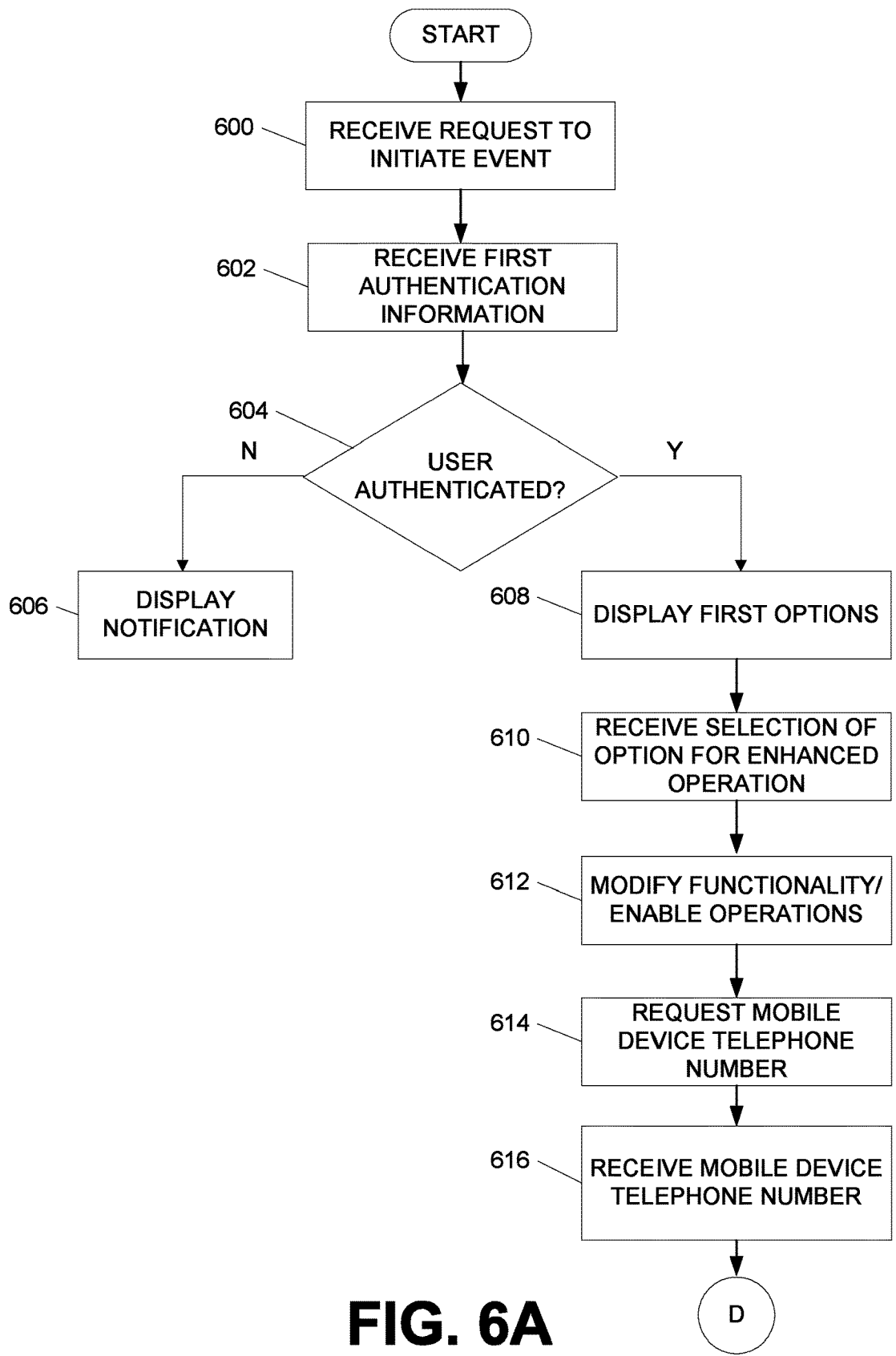
FIGS. 6A and 6B illustrate still another example method of modifying operations of a computing device and processing an event according to one or more aspects described herein.
Figure 6B:
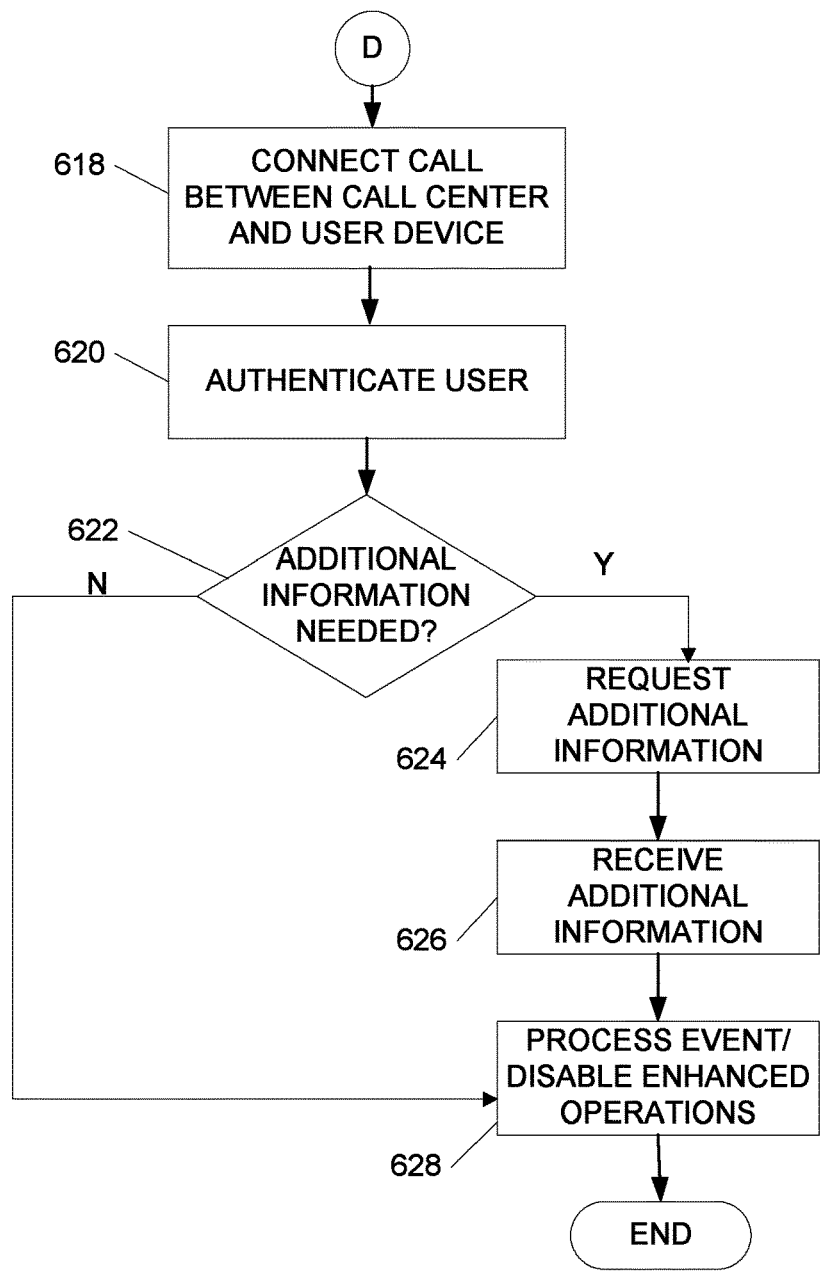

FIGS. 6A and 6B illustrate yet another example of modifying functionality of a computing device and processing an event according to one or more aspects described herein. In step 600, a request to initiate an event may be received. The request to initiate an event may be performed similarly to other arrangements described herein. In step 602, first authentication information may be received. Similar to one or more other arrangements described herein, the first authentication information may include a PIN, password, or other authentication information that may be compared to pre-stored authentication information to authenticate a user.

In step 604, a determination is made as to whether the user is authenticated. This determination may be performed similarly to other arrangements described herein. If, in step 604, the user is not authenticated, a notification may be displayed to the user in step 606. If the user is authenticated, in step 608 a first plurality of options may be displayed to the user. The first plurality of options may include default operations provided by the self-service device or ATM (e.g., enhanced operations may be disabled in this mode of operation).

In step 610, user input selecting an option to receive options for enhanced operations of the self-service device or ATM may be received. In step 612, the functionality of the self-service device or ATM may be modified and enhanced operations may be enabled. In step 614, the system may request, e.g., via a display of the self-service device or ATM, a mobile device telephone number at which the user may be contacted. In step 616, the user may input his or her mobile device telephone number using, for instance, a keypad associated with the self-service device or ATM.

In step 618, a call between the user and the system may be initiated. For instance, the device functionality and event processing computing platform may instruct a call center computing system to call the received mobile device telephone number. Upon a connection being made, an automated assistance system may assist the user. Additionally or alternatively, upon the connection being made, the call center computing system may engage a call center operator to assist the user.

In step 620, the user may provide second or additional authentication information to authenticate the user. Similar to arrangements discussed above, additional authentication information may be provided via the self-service device or ATM for via the mobile computing device of the user and may include biometric data, PIN, password, and the like.

In step 622, a determination is made as to whether additional information may be needed to process the event. Additional information may include additional documentation, photographic identification, and the like. If additional information is not needed, the event may be processed in step 628. If additional information is needed, the information may be requested in step 624. In step 626, the information may be received. In some examples, the information may be scanned or captured by a camera of the mobile device of the user and transmitted to the device functionality and event processing computing platform. In another example, the camera associated with the self-service device or ATM may be used to capture one or more images of the additional information. For instance, upon receiving a request for additional information, the user may hold the requested information (e.g., photo ID) in front of the camera associated with the self-service device or ATM. The camera may then capture an image or transmit, e.g., in real-time, the image of the identification to the device functionality and event processing computing platform for further processing.

In step 628, the event may be processed and, upon completion of the processing, the enhanced operations may be disabled and the self-service device or ATM may return to default functionality.

Figure 7:
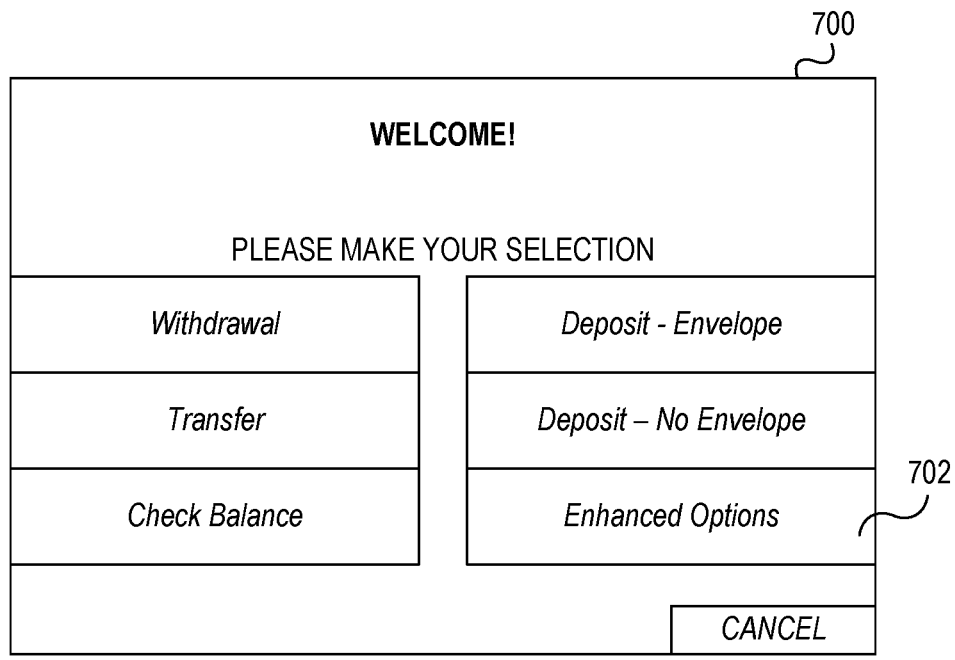
FIG. 7 illustrates one example user interface that may be generated and displayed to a user at a computing device according to one or more aspects described herein.

FIG. 7 illustrates one example user interface 700 that may be generated by, for instance, the user interface generating module 113 in FIG. 1. The user interface 700 may be displayed to a user upon initiating an event. The user interface provides a first plurality of options available for selection. In some examples, the first plurality of options displayed in the user interface 700 may include default options (e.g., enhanced options are not displayed because they are disabled).

Interface 700 includes an option 702 for enhanced options. A user may select the enhanced options option 702 and the system may modify the functionality of the computing device (e.g., ATM) to enable one or more enhanced operations of the device, as discussed herein.

Figure 8:
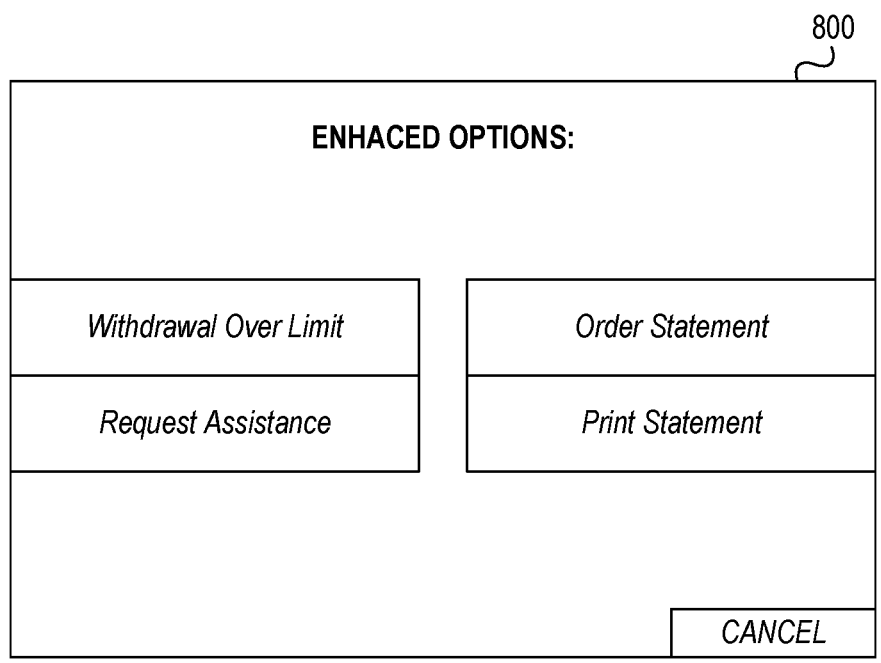
FIG. 8 illustrates another example user interface that may be generated and displayed to a user at a computing device according to one or more aspects described herein.

Upon selecting enhanced options option 702, another user interface may be generated (e.g., by the user interface generating module 113) and may be displayed to the user. The interface 800 shown in FIG. 8 may include one or more enhanced options available to the user. The enhanced options are displayed for selection and have been enabled, as discussed herein. Various other enhanced operations may be provided on the display without departing from the invention.

In some examples, the enhanced operations provided, or number of enhanced operations provided may be determined based on a user conducting the transaction at the self-service device. For instance, a user who is a customer of the entity associated with the self-service device (e.g., has one or more accounts with the entity, has a loan or line of credit with the entity, or the like) may receive more enhanced operations available for selection (e.g., a greater number of enhanced operations may be enabled) than a user who is not a customer of the entity. In another example, a user who has had a longstanding relationship with the entity (e.g., has been a customer for greater than a predetermined threshold amount of time) may receive different or more enhanced options for selection than a relatively new customer (e.g., a user who has not been a customer for a time period greater than the threshold). The determination of one or more characteristics of the user and/or options to provide may be based on user information retrieved from the database (e.g., based on data read from the card).

Figure 9:
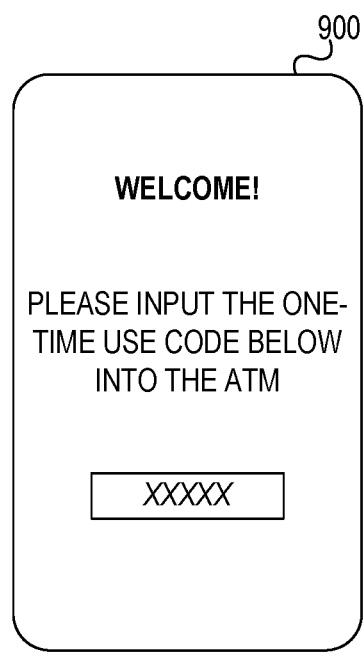
FIG. 9 illustrates one example user interface that may be generated and displayed on a user computing device according to one or more aspects described herein.

FIG. 9 illustrates one example user interface that may be displayed on a user computing device, such as a mobile computing device of a user. The user interface 900 may be used to provide second authentication information and/or location confirmation information to the user. For instance, as discussed above, upon selecting enhanced options, additional authentication information may be requested. In one example, the device functionality and event processing computing platform may generate and transmit a one-time use code to the mobile device of the user (e.g., via SMS to a pre-stored number associated with the device). The one-time use code may be displayed in a user interface 900 as shown in FIG. 9. The user may then input the one-time use code into the self-service device or ATM in order to provide authentication information and also to confirm that the user is physically at the location of the self-service device or ATM, which provides further authentication and confidence that the event being processed is not an unauthorized event or activity.

As discussed herein, various aspects described provide enhanced functionality at a computing device, such as a self-service device or an ATM, by using an additional computing device, such as the mobile computing device of the user, to provide additional information, authentication information, and the like. Below are some example arrangements in which various aspects of the description may be used. The examples below are merely some example arrangements and are not intended to limit the invention to only these example arrangements.

In one example, a user may desire to withdraw $1000 from an ATM. In a default operation mode, the ATM may only permit a withdrawal of $500. In some examples, the withdrawal limit may be because of policies requiring display of a photographic identification of a person requesting the withdrawal in order to complete withdrawals over the limit amount. Accordingly, the user may initiate an event at the ATM by inserting his or her card into the device and entering a PIN in order to authenticate himself/herself. Upon being authenticated, the ATM may display a plurality of options available for selection. One available option may include "enhanced operations."

Upon receiving selection of the enhanced operations option, the system may modify the functionality of the ATM and may enable one or more enhanced operations.

Alternatively, the user may select, from the plurality of options displayed, an option for "withdrawal." Upon selecting the option, the ATM may request user input indicating the desired amount for withdrawal. The user may then enter $1000 (which is over the limit of $500). Selection of an amount over the limit may cause a response similar to selection of "enhanced operations" option and may cause the system to modify functionality of the ATM in order to enable the enhanced operations.

The system may then indicate that the desired amount is over the limit and that an enhanced operation is being provided. The system may then request additional authentication information. In some examples, the system may request a fingerprint or other biometric data of the user. The user may then initiate operation of an on-line or mobile application on a mobile computing device of the user. The on-line or mobile application may then prompt a user to enter his or her fingerprint or other biometric data to authenticate the user. Upon authentication, the user may be provided with a plurality of enhanced operations available for selection, or may be prompted to confirm, via the ATM, that he or she would like to proceed with the withdrawal over the limit.

If so, the system may determine whether additional information is needed. In this example, a photographic identification may be needed to process the operation. Accordingly, the user may capture an image of the photographic identification and may transmit it to the system for processing. In some examples, the system may evaluate the image (e.g., using optical character recognition or other processes) to confirm an identity of the user. In other examples, an associate may be requested to review the image and confirm the identity of the user. Once confirmed, the event may be processed, the funds may be distributed and the enhanced operations may be disabled such that a next user of the ATM may access the default operations.

In another example, a user may desire to print a statement associated with an account of the user. This is not an operation provided by a self-service device or an ATM in a default operation mode. Accordingly, a user may initiate an event and may be authenticated (e.g., using a card and PIN combination). Upon being authenticated, the user may select an "enhanced operations" option from a plurality of options available. The system may then modify functionality of the self-service device or ATM and enable one or more enhanced operations.

The system may then request second authentication information from the user. In this example, the system may call a pre-stored telephone number associated with the user. The user may then speak directly with an associate (e.g., a call center associate) to further process the event and provide any additional information. For instance, the call center associate may request that the user input a one-time use code transmitted to the mobile device of the user into the self-service device or ATM to confirm a location of the user.

Upon authenticating the user, the system may request any additional information and the call-center associate may provide an instruction to the self-service device or ATM (e.g., via a call center computing device) to print a statement for the user. The self-service device or ATM may process the request and generate the requested statement.

As indicated above, these are merely some example arrangements that may be used with aspects described herein. Various other arrangements may be used without departing from the invention.

Figure 10:
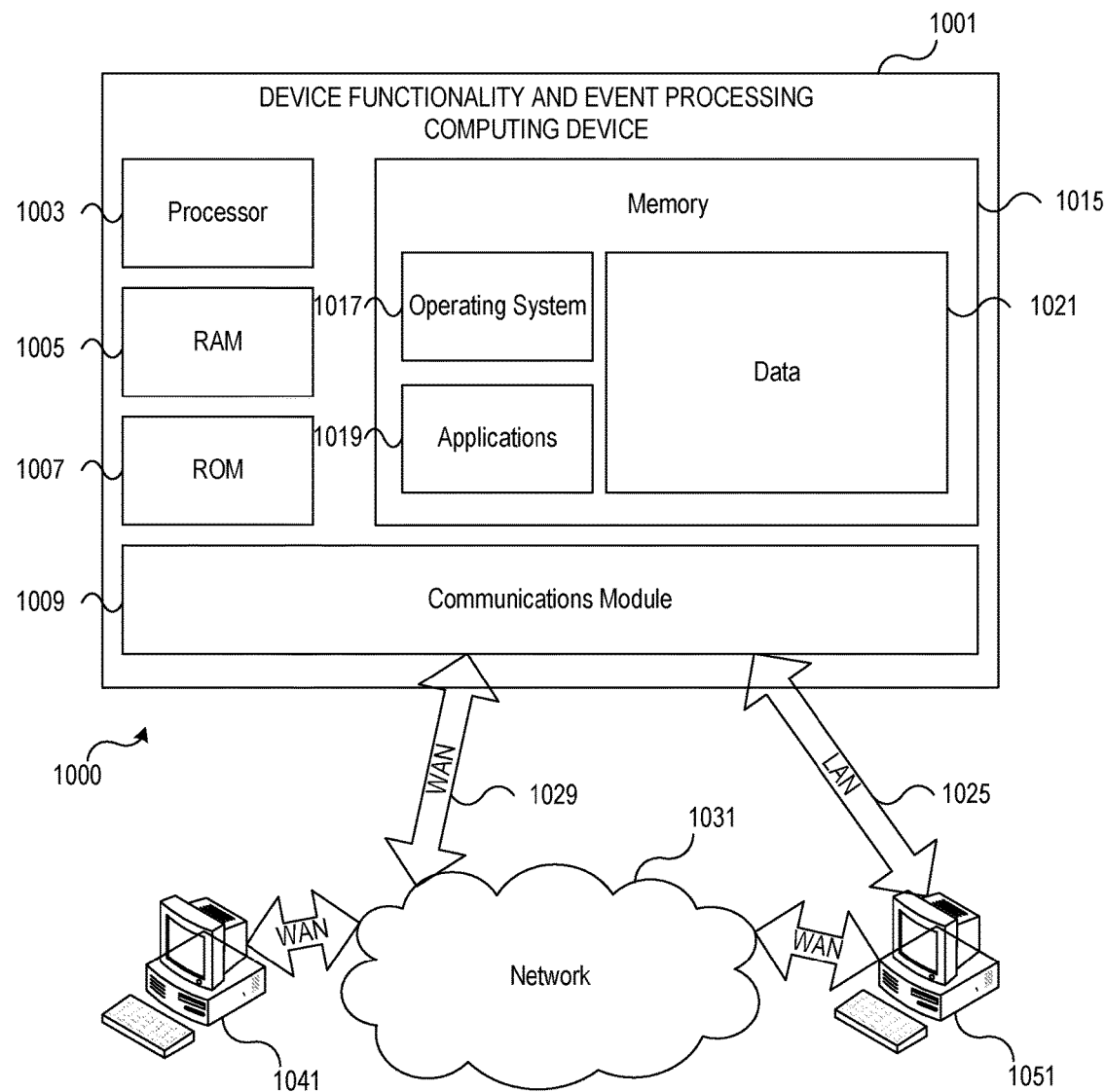
FIG. 10 illustrates one example operating environment in which various aspects of the disclosure may be implemented in accordance with one or more aspects described herein.

FIG. 10 depicts an illustrative operating environment in which various aspects of the present disclosure may be implemented in accordance with one or more example embodiments. Referring to FIG. 10, computing system environment 1000 may be used according to one or more illustrative embodiments. Computing system environment 1000 is only one example of a suitable computing environment and is not intended to suggest any limitation as to the scope of use or functionality contained in the disclosure. Computing system environment 1000 should not be interpreted as having any dependency or requirement relating to any one or combination of components shown in illustrative computing system environment 1000.

Computing system environment 1000 may include device functionality and event processing computing device 1001 having processor 1003 for controlling overall operation of device functionality and event processing computing device 1001 and its associated components, including random-access memory (RAM) 1005, read-only memory (ROM) 1007, communications module 1009, and memory 1015. Device functionality and event processing computing device 1001 may include a variety of computer readable media. Computer readable media may be any available media that may be accessed by device functionality and event processing computing device 1001, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 1001.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on device functionality and event processing computing device 1001. Such a processor may execute computer-executable instructions stored on a computer-readable medium.

Software may be stored within memory 1015 and/or storage to provide instructions to processor 1003 for enabling device functionality and event processing computing device 1001 to perform various functions. For example, memory 1015 may store software used by device functionality and event processing computing device 1001, such as operating system 1017, application programs 1019, and associated database 1021. Also, some or all of the computer executable instructions for device functionality and event processing computing device 1001 may be embodied in hardware or firmware. Although not shown, RAM 1005 may include one or more applications representing the application data stored in RAM 1005 while device functionality and event processing computing device 1001 is on and corresponding software applications (e.g., software tasks) are running on device functionality and event processing computing device 1001.

Communications module 1009 may include a microphone, keypad, touch screen, and/or stylus through which a user of device functionality and event processing computing device 1001 may provide input, and may also include one or more of a speaker for providing audio output and a video display device for providing textual, audiovisual and/or graphical output. Computing system environment 1000 may also include optical scanners (not shown). Exemplary usages include scanning and converting paper documents, e.g., correspondence, receipts, and the like, to digital files.

Device functionality and event processing g computing device 1001 may operate in a networked environment supporting connections to one or more remote computing devices, such as computing devices 1041 and 1051. Computing devices 1041 and 1051 may be personal computing devices or servers that include any or all of the elements described above relative to device functionality and event processing computing device 1001.

The network connections depicted in FIG. 10 may include local area network (LAN) 1025 and wide area network (WAN) 1029, as well as other networks. When used in a LAN networking environment, device functionality and event processing computing device 1001 may be connected to LAN 1025 through a network interface or adapter in communications module 1009. When used in a WAN networking environment, device functionality and event processing computing device 1001 may include a modem in communications module 1009 or other means for establishing communications over WAN 1029, such as network 1031 (e.g., public network, private network, Internet, intranet, and the like). The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 11:
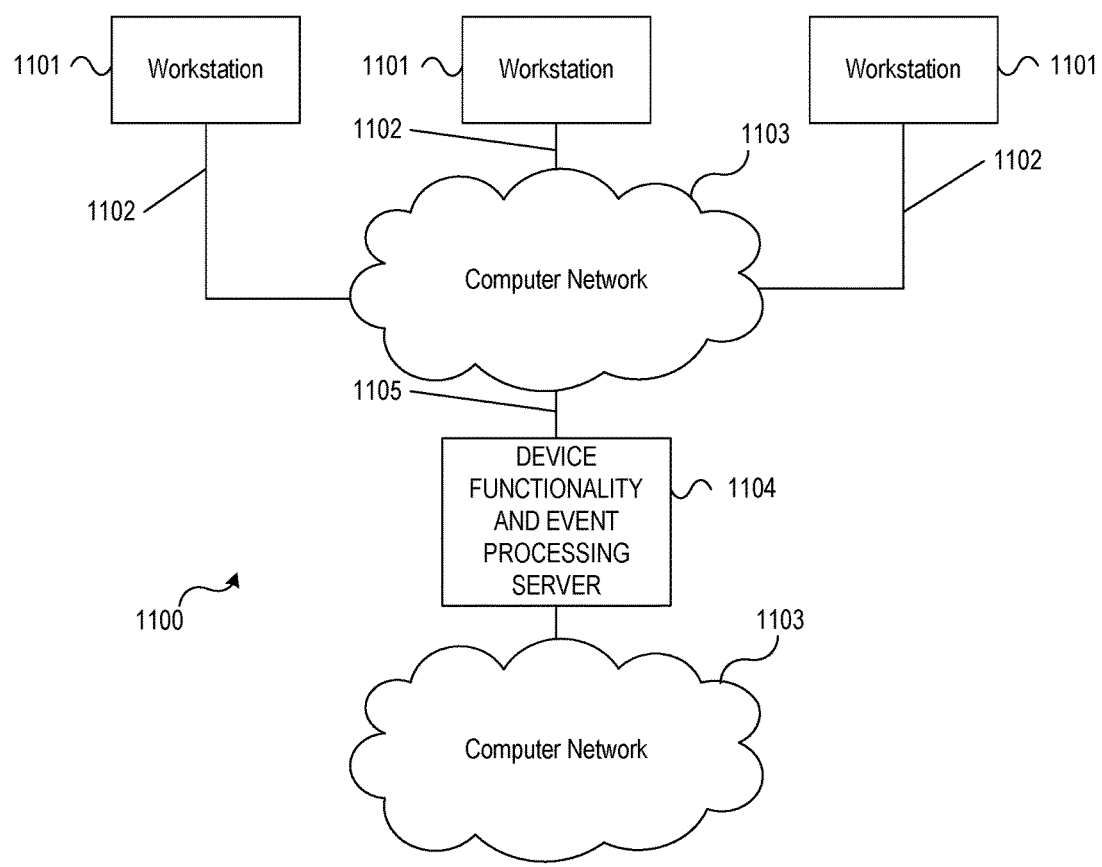
FIG. 11 depicts an illustrative block diagram of workstations and servers that may be used to implement the processes and functions of certain aspects of the present disclosure in accordance with one or more aspects described herein.

FIG. 11 depicts an illustrative block diagram of workstations and servers that may be used to implement the processes and functions of certain aspects of the present disclosure in accordance with one or more example embodiments. Referring to FIG. 11, illustrative system 1100 may be used for implementing example embodiments according to the present disclosure. As illustrated, system 1100 may include one or more workstation computers 1101. Workstation 1101 may be, for example, a desktop computer, a smartphone, a wireless device, a tablet computer, a laptop computer, and the like, configured to perform various processes described herein. Workstations 1101 may be local or remote, and may be connected by one of communications links 1102 to computer network 1103 that is linked via communications link 1105 to device functionality and event processing server 11004. In system 1100, device functionality and event processing server 1104 may be any suitable server, processor, computer, or data processing device, or combination of the same, configured to perform the functions and/or processes described herein. Server 1104 may be used to process the instructions received from one or more devices, process events, generate identifiers, and the like.

Computer network 1103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 1102 and 1105 may be any communications links suitable for communicating between workstations 1101 and device functionality and event processing server 1104, such as network links, dial-up links, wireless links, hard-wired links, as well as network types developed in the future, and the like.

As discussed herein, the arrangements described herein may provide enhanced operations at a self-service device or an ATM by using one or more other computing devices, such as a mobile device of a user, to process events that typically could not be processed by a self-service device or an ATM. Accordingly, users may receive enhanced functionality without entities associated with the self-service device or ATM physically modifying the self-service device or ATM device itself or adding components, such as a scanner, microphone, speaker, camera, or the like.

In addition, aspects described herein may be used to process pre-queued transactions. That is, a user may pre-queue a transaction from his or her mobile device, home computing device, or the like, and may complete the transaction via a self-service device or an ATM. The self-service device or ATM may request authentication information via the mobile device of the user, additional information via the mobile device of the user, and the like, as described herein, and may process the requested transaction.

In other examples, if a self-service device or an ATM screen is cracked or otherwise obscured but the self-service device or ATM is still functioning, the user may interact with the self-service device or ATM via the mobile device, may request the self-service device or ATM to have a call center associate call the mobile device of the user, or the like, in order to complete a transaction.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers or platforms and one or more networks. The functionality may be distributed in any manner, or may be located in a single computing device (e.g., a server, a client computer, and the like), or across multiple computing devices. In such arrangements, any and/or all of the above-discussed communications between modules of the computing platform may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A device functionality and event processing computing platform, comprising:
   at least one processor;
   a communication interface communicatively coupled to the at least one processor; and
   at least one memory storing computer-readable instructions that, when executed by the at least one processor, cause the device functionality and event processing computing platform to:
      receive a request to initiate an event;
      receive first authentication information from a user;
      authenticate the user based on the received first authentication information;
      responsive to determining that the user is authenticated, generate a first user interface including a first plurality of selectable options, each selectable option of the first plurality of selectable options associated with a default operations of a computing device;
      cause the first user interface to be displayed on a display of the computing device;
      receive selection of one option from the first plurality of selectable options, the selected option including a request for enhanced operation functionality of the computing device, enhanced operation functionality of the computing device including functionality not available in default operations of the computing device;
      responsive to receiving the selection of the option including a request for enhanced operation functionality of the computing device, enabling enhanced operation functionality of the computing device and modifying functionality of the computing device to provide the enhanced operation functionality including the functionality not available in default operations of the computing device, the enhanced operation functionality being different from the default operations of the computing device;
      request second authentication information;
      receive, via a mobile device of the user, the requested second authentication information;
      authenticate the user based on the second authentication information;
      responsive to determining that the user is authenticated based on the second authentication information, generate a second user interface including a second plurality of selectable options, each selectable option of the second plurality of selectable options associated with an enhanced operation function of the computing device;
      cause the second user interface to be displayed on the display of the computing device;
      receive selection of one option from the second plurality of options;

determine, based on the selected option from the second plurality of options, that additional information is needed to process the requested option;

receive, via the mobile device of the user, the additional information, the additional information including image data including at least one of: an image of a photographic identification of the user and an image of a document associated with the event;

process the requested option based on at least the received additional information; and disable the enhanced operation functionality of the computing device.

2. The device functionality and event processing computing platform of claim 1, wherein the computing device is a separate device from the computing platform.

3. The device functionality and event processing computing platform of claim 1, wherein the computing device is an automated teller machine (ATM).

4. The device functionality and event processing computing platform of claim 1, wherein the image data is captured via a camera of the mobile device of the user.

5. The device functionality and event processing computing platform of claim 1, wherein the requested second authentication information includes biometric data of the user.

6. The device functionality and event processing computing platform of claim 1, wherein requesting the second authentication information includes transmitting a one-time use code to the mobile device of the user, and wherein receiving the second authentication information includes receiving, via the computing device, user input including the one-time use code transmitted to the mobile device of the user.

7. The device functionality and event processing computing platform of claim 1, wherein the second authentication information includes receiving, from the mobile device of the user, a scan of a machine-readable code located on the computing device.

8. A method, comprising:

receiving, by a device functionality and event processing computing platform and from a computing device, a request to initiate an event;

receiving, by the device functionality and event processing computing platform, first authentication information from a user;

authenticating, by the device functionality and event processing computing platform, the user based on the received first authentication information;

responsive to determining that the user is authenticated, generating, by the device functionality and event processing computing platform, a first user interface including a first plurality of selectable options, each selectable option of the first plurality of selectable options associated with a default operations of a computing device;

causing, by the device functionality and event processing computing platform, the first user interface to be displayed on a display of the computing device;

receiving, by the device functionality and event processing computing platform selection of one option from the first plurality of selectable options, the selected option including a request for enhanced operation functionality of the computing device, enhanced operation functionality of the computing device including functionality not available in default operations of the computing device;

responsive to receiving the selection of the option including a request for enhanced operation functionality of the computing device, enabling, by the device functionality and event processing computing platform, enhanced operation functionality of the computing device and modifying functionality of the computing device to provide the enhanced operation functionality including the functionality not available in default operations of the computing device, the enhanced operation functionality being different from the default operations of the computing device;

requesting, by the device functionality and event processing computing platform, second authentication information;

receiving, by the device functionality and event processing computing platform and via a mobile device of the user, the requested second authentication information;

authenticating, by the device functionality and event processing computing platform, the user based on the second authentication information;

responsive to determining that the user is authenticated based on the second authentication information, generating, by the device functionality and event processing computing platform, a second user interface including a second plurality of selectable options, each selectable option of the second plurality of selectable options associated with an enhanced operations function of the computing device;

causing, by the device functionality and event processing computing platform, the second user interface to be displayed on the display of the computing device;

receiving, by the device functionality and event processing computing platform, selection of one option from the second plurality of selectable options;

determining, by the device functionality and event processing computing platform and based on the selected option from the second plurality of options, that additional information is needed to process the requested option;

receiving, by the device functionality and event processing computing platform and via the mobile device of the user, the additional information, the additional information including image data including at least one of: an image of a photographic identification of the user and an image of a document associated with the event;

processing, by the device functionality and event processing computing platform, the requested option based on at least the received additional information; and disabling, by the device functionality and event processing computing platform, the enhanced operations functionality of the computing device.

9. The method of claim 8, wherein the computing device is a separate device from the computing platform.

10. The method of claim 8, wherein the computing device is an automated teller machine (ATM).

11. The method of claim 8, wherein the image data is captured via a camera of the mobile device of the user.

12. The method of claim 8, wherein the requested second authentication information includes biometric data of the user.

13. The method of claim 8, wherein requesting the second authentication information includes transmitting a one-time use code to the mobile device of the user, and wherein receiving the second authentication information includes receiving, via the computing device, user input including the one-time use code transmitted to the mobile device of the user.

14. The method of claim 8, wherein the second authentication information includes receiving, from the mobile device of the user, a scan of a machine-readable code located on the computing device.

15. One or more non-transitory computer-readable media storing instructions that, when executed by a computer system comprising at least one processor, memory, and a communication interface, cause the computer system to:
receive a request to initiate an event;
receive first authentication information from a user;
authenticate the user based on the received first authentication information;
responsive to determining that the user is authenticated, generate a first user interface including a first plurality of selectable options, each selectable option of the first plurality of selectable options associated with a default operation of a computing device;
cause the first user interface to be displayed on a display of the computing device;
receive selection of one option from the first plurality of selectable options, the selected option including a request for enhanced operation functionality of the computing device, enhanced operation functionality of the computing device including functionality not available in default operations of the computing device;
responsive to receiving the selection of the option including a request for enhanced operations functionality of the computing device, enabling enhanced operation functionality of the computing device and modifying functionality of the computing device to provide the enhanced operation functionality including the functionality not available in default operations of the computing device, the enhanced operation functionality being different from the default operations of the computing device;
request second authentication information;
receive, via a mobile device of the user, the requested second authentication information;
authenticate the user based on the second authentication information;
responsive to determining that the user is authenticated based on the second authentication information, generate a second user interface including a second plurality of selectable options, each selectable option of the second plurality of selectable options associated with an enhanced operations function of the computing device;
cause the second user interface to be displayed on the display of the computing device;
receive selection of one option from the second plurality of selectable options;
determine, based on the selected option from the second plurality of options, that additional information is needed to process the requested option;
receive, via the mobile device of the user, the additional information, the additional information including image data including at least one of: an image of a photographic identification of the user and an image of a document associated with the event;
process the requested option based on at least the received additional information; and
disable the enhanced operations functionality of the computing device.

16. The one or more non-transitory computer-readable media of claim 15, wherein the computing device is an automated teller machine (ATM).

17. The one or more non-transitory computer-readable media of claim 15, wherein the image data is captured via a camera of the mobile device of the user.

18. The one or more non-transitory computer-readable media of claim 15, wherein the requested second authentication information includes biometric data of the user.

* * * * *